United States Patent
Stiers et al.

(10) Patent No.: US 12,254,672 B1
(45) Date of Patent: Mar. 18, 2025

(54) POLICY BASED REPRESENTATION BASED ON CLASSIFICATION INFORMATION

(71) Applicant: Citigroup Inc., New York, NY (US)

(72) Inventors: Misty Stiers, New York, NY (US); Christopher James Byrne, New York, NY (US); Kirk M. Lewis, II, Irving, TX (US); Miriam Silver, Tel Aviv (IL)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 18/951,476

(22) Filed: Nov. 18, 2024

(51) Int. Cl.
| | |
|---|---|
| *G06V 10/764* | (2022.01) |
| *G06F 16/535* | (2019.01) |
| *G06F 16/538* | (2019.01) |
| *G06V 10/82* | (2022.01) |
| *G06V 40/10* | (2022.01) |

(52) U.S. Cl.
CPC ......... *G06V 10/764* (2022.01); *G06F 16/535* (2019.01); *G06F 16/538* (2019.01); *G06V 10/82* (2022.01); *G06V 40/10* (2022.01); *G06V 2201/10* (2022.01)

(58) Field of Classification Search
None
See application file for complete search history.

(56) References Cited

U.S. PATENT DOCUMENTS

| | | | | |
|---|---|---|---|---|
| 2016/0294839 | A1* | 10/2016 | Walline | H04W 12/088 |
| 2018/0004966 | A1* | 1/2018 | Chan | G06T 1/0007 |
| 2018/0041504 | A1* | 2/2018 | Balasubramanian | H04L 63/102 |
| 2019/0340373 | A1* | 11/2019 | Bulpin | G06F 21/6209 |

FOREIGN PATENT DOCUMENTS

| | | | | |
|---|---|---|---|---|
| JP | 2010250657 A | * | 11/2010 | G06F 16/5838 |

\* cited by examiner

*Primary Examiner* — Bernard Krasnic
(74) *Attorney, Agent, or Firm* — Davis Wright Tremaine LLP

(57) ABSTRACT

A system or technique can analyze metadata from a first set of images using a neural network to identify classification information about individuals depicted in the images. The system generates data based on this classification information, including attributes of the individuals, and compares this data against predefined criteria for image presentations. If any attributes are found to be non-compliant with the criteria, the system queries a database of second image metadata linked to a set of images. This database includes data generated from prior presentations and classification information provided by individuals depicted in the images. The system locates compliant attributes in the second image metadata, retrieves an image linked to these compliant attributes, and modifies a presentation to include the retrieved image.

20 Claims, 9 Drawing Sheets

POLICY BASED REPRESENTATION BASED ON CLASSIFICATION INFORMATION

CROSS REFERENCE TO RELATED APPLICATION

This application incorporates by reference for all purposes the full disclosure of co-pending U.S. patent application Ser. No. 18/951,484, filed concurrently herewith, entitled "GRAPHICAL USER INTERFACE TO ADJUST IMAGE SELECTION BASED ON CLASSIFICATION INFORMATION".

BACKGROUND

Some entities, such as corporations, endeavor to incorporate various demographics into their advertisement frameworks and/or customer journey frameworks. These frameworks can be presented to users in a variety of formats through different channels, which are tailored to enhance engagement and effectiveness. For example, the various formats used for these frameworks can include visual advertisements placed on webpages, social media platforms, television, streaming services, or can be delivered through email marketing and/or push notifications to various computing devices. Incorporating various demographics in advertisements is not just a marketing strategy; it is also an important element of ethical branding and social responsibility. It helps create a more inclusive marketplace, builds trust, and enhances engagement, ultimately benefiting both brands and consumers. The manner in which these advertisement frameworks and/or customer journey frameworks are developed and generated can be improved.

BRIEF DESCRIPTION OF THE DRAWINGS

Various techniques will be described with reference to the drawings, in which.

DETAILED DESCRIPTION

Figure 1:
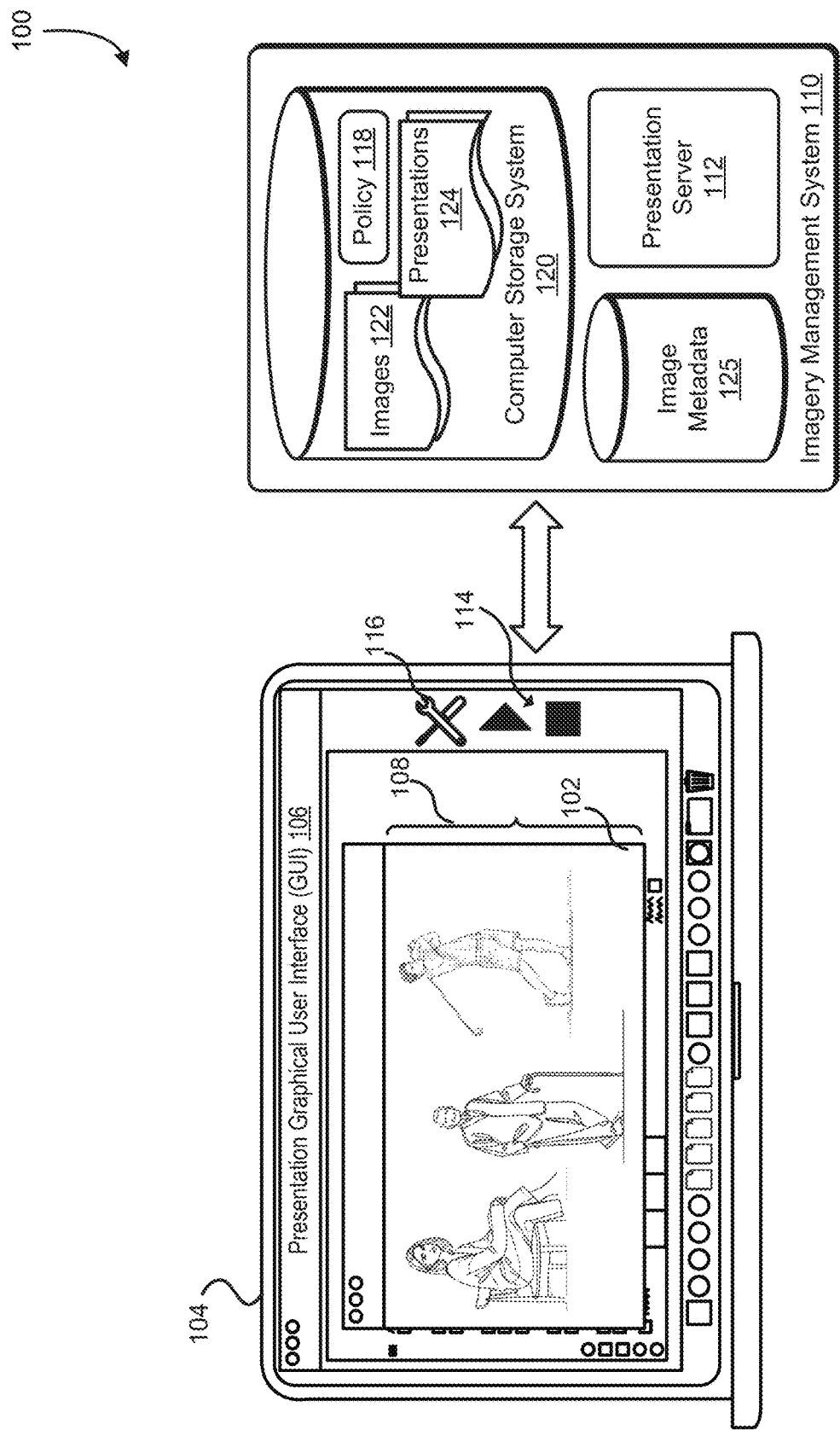
FIG. 1 illustrates a system environment to provide access to and allow modification of one or more computer-implemented presentations of images, in accordance with an embodiment.

The techniques and systems described below relate to generating or modifying advertisement frameworks and/or customer journey frameworks that include imagery depicting individuals. The described techniques and systems can also be used to audit or evaluate frameworks that incorporate imagery, based on rules that provide guidelines and standards for the depiction of individuals and groups in the imagery. This imagery can include both video and static images showing the individuals. Metadata can be linked to the imagery, which may be included in the frameworks. This metadata can identify classification information pertaining to the individuals depicted. The classification information may be directly provided by the individuals themselves and can include various attributes. For example, these attributes might encompass demographic information such as gender, race, ability, and age. In some cases, this demographic information is generated at least in part by a neural network trained to recognize demographic characteristics of individuals depicted in the imagery.

The described techniques and systems can leverage a policy that outlines guidelines and standards for how individuals and groups are depicted in marketing materials. A goal of the policy is to ensure that representations in advertisement frameworks and/or customer journey frameworks are diverse, inclusive, and respectful. For example, the policy can be used to ensure that the frameworks reflect a wide range of identities, including different races, genders, ages, abilities, sexual orientations, and cultural backgrounds. Additionally, the policy can be put in place to ensure inclusivity by considering how various audiences may engage with advertisements. In some examples, the policy can be used to establish a process for reviewing the frameworks to ensure they meet representation standards, and create mechanisms for accountability and feedback.

The advertisement frameworks and/or customer journey frameworks can be evaluated against the policy to determine if they comply with the representation criteria outlined in the policy. These criteria can be specifically tailored to assess representation in imagery. Consequently, the policy can include demographic categories for analysis, such as race, gender, age, ability, sexual orientation, and cultural background. In some instances, one or more criteria may encompass relevant subcategories within each demographic category to enhance specificity, such as ethnic groups and/or gender identities. Additionally, the policy can include metrics for assessing representation, such as the percentages of individuals from various demographic groups. It may also establish one or more thresholds (e.g., threshold values) for demographic representation to ensure a minimum level of diversity is achieved in the advertisement frameworks and/or customer journey frameworks.

Evaluation of advertising frameworks and/or customer journey frameworks based on the policy can include assessing the metadata of images used in the frameworks to identify classification information for individuals depicted in those images. As described, the classification information may include attributes related to gender, race, ability, and age of the individuals depicted. The identified classification information can be compared against the representation criteria outlined in the policy. This comparison can be used to determine if the imagery used in the frameworks complies (e.g., conforms) with the representation criteria set forth in the policy. Noncompliance compliance condition of the imagery may prompt the described techniques and systems to modify the frameworks to include additional imagery featuring individuals with attributes that bring the noncompliant frameworks into alignment with the policy. Alternatively or in addition, noncompliance may lead the described techniques and systems to modify the frameworks by removing imagery featuring individuals in an effort to achieve a compliance condition with the policy. In some examples, a noncompliance condition may lead to the described techniques and systems to modify the frameworks by removing imagery from the frameworks and adding new imagery to the frameworks to achieve a compliance condition with policy.

Images available for inclusion in advertising frameworks and/or customer journey frameworks can be hosted in storage associated with an entity, such as a company, that produces and/or uses these frameworks. For example, each image available for inclusion may have associated metadata. This metadata can include demographic information for the individuals depicted in the image or images. The demographic information can identify characteristics such as gender, race, ability, and/or age of the individuals shown. This information can be directly provided by the individuals depicted in the imagery. In some cases, the demographic information is provided by the individuals and then stored electronically in one or more digital files hosted in the entity's storage. Images available for inclusion in the frameworks can be selected based on metrics data generated from their prior use, such as in presentations, advertising, and/or frameworks. This metrics data can be derived from evaluating how the presentations/frameworks were utilized. For instance, the metrics data may be generated from positive feedback provided by the audience of the presentations/frameworks disseminated.

The images available for inclusion in advertising frameworks and/or customer journey frameworks can be used to create new frameworks. Alternatively, these images can also modify existing frameworks. For example, they can be employed to adjust frameworks that are found to be out of compliance with a policy governing the imagery used in frameworks. This policy may include thresholds (e.g., threshold values) related to gender, race, ability, and/or age for individuals depicted in the imagery of the frameworks. Such thresholds can include a set of alphanumeric characters and/or threshold values defining one or more criteria for presenting imagery that includes individuals. Evaluation of the imagery used in the framework—based at least in part on the metadata and the policy—can reveal that the imagery does not satisfy the policy criteria for representations involving individuals. For instance, the evaluation might show insufficient representation of individuals of a certain gender, race, ability, and/or age. This determination can prompt the described systems and techniques to identify, using the information and metadata, at least one image from the available set that can be incorporated into a non-compliant framework. The selected image can then be added to the framework and reevaluated based on the policy to determine if it is now in compliance.

The described systems and techniques can provide a graphical user interface (GUI) to display and create advertising frameworks and customer journey frameworks. The GUI enables users to locate images available for inclusion in these frameworks. For instance, the GUI may feature input elements such as text boxes, sliders, and radio buttons, allowing users to specify desired characteristics like gender, race, ability, and age for individuals depicted in the images stored in the computer. In some cases, certain GUI input elements are pre-populated with demographic information corresponding to the framework displayed. When a user modifies one of the pre-populated input elements to obtain additional imagery for the framework, the system can automatically adjust the demographic information in the pre-populated GUI input elements.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

Any system or apparatus feature as described herein can include computer programs and computer program products comprising software code adapted, when executed on a data processing apparatus, to perform any of the methods and/or for embodying any of the apparatus and system features described herein, including any or all of the component steps of any method. Any system or apparatus feature as described herein can also include a computer or computing system (including networked or distributed systems) having an operating system that supports a computer program for carrying out any of the methods described herein and/or for embodying any of the apparatus or system features described herein. Any system or apparatus feature as described herein can also include a computer readable media having stored thereon any one or more of the computer programs aforesaid. Any system or apparatus feature as described herein can include a signal carrying any one or more of the computer programs aforesaid.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In at least one embodiment a system can include one or more processors; and memory that stores computer-executable instructions that, as a result of execution by the one or more processors, cause the system to at least: analyze first image metadata to extract first classification information pertaining to a first set of individuals depicted in a presentation of images, the first image metadata generated using a neural network to classify characteristics of the first set of individuals; generate first data based on the first classification information, the first data including first attributes derived from the classification information associated with the first set of individuals; compare the first data against a set of alphanumeric characters defining one or more criteria for presentations of imagery including individuals; based on the comparison of the first data against the set of alphanumeric characters defining one or more criteria for presentations of imagery including individuals, determine one or more of the first attributes pertaining to the first set of individuals deviate from the set of alphanumeric characters defining one or more criteria for presentations of imagery including individuals; query a database including second image metadata linked to a set of images available for inclusion in the presentation of the images, the set of images selected based on metrics data generated from prior evaluations of image usage, the second image metadata comprising second data for a second set of individuals depicted in the set of images, the second data generated from second classification information stored in digital files and provided by the second set of individuals depicted in the set of images, the query identifying second attributes included in the second data that confirm to set of alphanumeric characters defining one or more criteria for presentations of imagery including individuals; retrieve an image from the set of images, the image associated with the second attributes pertaining to the individuals in the second set of images confirming to the set of alphanumeric characters defining one or more criteria for presentations of imagery including individuals; and adjust the presentation of images to include the retrieved image.

In at least one embodiment, the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising one or more of gender data, race data, ability data, or age data for individuals depicted in presentations of imagery including individuals.

In at least one embodiment, the second classification information stored in digital files and provided by the second set of individuals comprises one or more of gender data, race data, ability data, or age data information.

In at least one embodiment, the presentation of images is comprised in one or more advertisements to be presented via social media, online advertising, television, or print media, and modifying the presentation of images to include the retrieved image comprises modifying the one or more advertisements to include the retrieved image.

In at least one embodiment, a computer-implemented method includes generating first data based on first classification information for a first set of individuals depicted in a presentation of images, the first data comprising one or more first attributes of the first set of individuals depicted in the presentation of images; comparing the first data against one or more criteria for presentations of imagery including individuals; determining a compliance condition based on a result of comparing the first data against the one or more criteria for presentations of imagery including individuals; based at least in part on the compliance condition, querying image metadata linked to a set of images available for inclusion in the presentation of images, the image metadata comprising second data for a second set of individuals depicted in the set of images, the second data generated from second classification information at least in part provided by the second set of individuals depicted in the set of images, querying the image metadata to identify one or more second attributes included in the second data that conform to the one or more criteria for presentations of imagery including individuals; and selecting one or more images in the second set of images to be associated with the presentation of images, the selected one or more images associated with the one or more second attributes.

In at least one embodiment, the first and second classification information comprises attribute information determined by a machine learning (ML) model trained to determine the attribute information associated with the imagery including individuals.

In at least one embodiment, the one or more first attributes comprise first classification data comprising one or more of an age data, gender data, or ethnicity data of the first set of individuals depicted in the presentation of images.

In at least one embodiment, the one or more criteria comprises data structured in JavaScript Object Notation (JSON) format.

In at least one embodiment, the second classification information comprises information provided by the second set of individuals.

In at least one embodiment, the image metadata comprises structured data at least for individuals depicted in imagery.

In at least one embodiment, the set of images includes one or more images collected based on metrics data generated based on prior evaluations of one or more images of the set of images.

In at least one embodiment, the metrics data comprises data generated based on feedback information determined from dissemination of the prior presentations including the set of images via one or more media accessible to end-users.

In at least one embodiment, a non-transitory computer-readable storage medium having stored thereon executable instructions that, if executed by one or more processors of a computer system, cause the computer system to at least: generate first data based on first classification information for a first set of individuals depicted in a presentation of images, the first data comprising one or more first attributes of the first set of individuals depicted in the presentation of images; compare the first data against one or more criteria for presentations of imagery including individuals; determine a compliance condition based on a result of comparing the first data against the one or more criteria for presentations of imagery including individuals; based at least in part on the compliance condition, query image metadata linked to a set of images available to be included in the presentation of images, the image metadata comprising second data for a second set of individuals depicted in the set of images, the second data generated from second classification information at least in part provided by the second set of individuals depicted in the set of images, querying the image metadata to identify one or more second attributes included in the second data that conform to the one or more criteria for presentations of imagery including individuals; and select one or more images in the second set of images to be associated with the presentation of images, the selected one or more images associated with the one or more second attributes.

In at least one embodiment, the first and second classification information comprises attribute information determined by a machine learning (ML) model trained to determine the attribute information associated with the imagery including individuals.

In at least one embodiment, the one or more first attributes comprise first classification data comprising one or more of an age data, gender data, or ethnicity data of the first set of individuals depicted in the presentation of images.

In at least one embodiment, the one or more criteria comprises data structured in JavaScript Object Notation (JSON) format.

In at least one embodiment, the second classification information comprises attribute data for the second set of individuals.

In at least one embodiment, the presentation of images is comprised in one or more digital or print media.

In at least one embodiment, the set of images includes one or more images collected based on metrics data.

In at least one embodiment, the metrics data comprises data based on information determined from use of the presentations including the set of images.

In at least one embodiment, a system includes one or more processors; and memory that stores computer-executable instructions that, as a result of execution by the one or more processors, cause the system to at least: provide a graphical user interface (GUI) comprising GUI input elements, each GUI input element of the GUI input elements associated with a different attribute of an individual to be depicted in a presentation; receive input data based on user interaction with a first GUI input element of the GUI input elements; based on the input data, query image metadata for a set of images for inclusion in the presentation, the set of images collected based on metrics data generated from evaluation of image usage, the image metadata comprising data for a set of individuals depicted in the set of images, the data generated from classification information stored in files in computer storage and provided by the set of individuals depicted in the set of images, the query identifying first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer storage, the image to be displayed by the GUI.

In at least one embodiment, the first GUI input element is associated with an ability attribute and the second GUI input element of the GUI input elements is associated with an age attribute.

In at least one embodiment, rendering the second GUI input element based, at least in part, on the second data comprises rendering the second GUI input element based on another attribute comprised in the second data.

In at least one embodiment, the classification information comprises one or more of gender data, ability data, or age data.

In at least one embodiment, the memory that stores the computer-executable instructions that, as a result of execution by the one or more processors, further cause the system to at least render each GUI input element of the GUI input elements based on a plurality of individuals depicted in the presentation.

In at least one embodiment, the metrics data comprises data associated with the prior presentations including the set of images.

In at least one embodiment, the presentation of images is comprised in one or more media.

In at least one embodiment, the input data comprises a percentage value, and rendering the second GUI input element of the GUI input elements includes generating a second input value comprising another percentage value.

In at least one embodiment, a computer-implemented method includes providing a graphical user interface (GUI) comprising GUI input elements, each GUI input element of the GUI input elements associated with a different attribute of an individual to be depicted in a presentation; receiving input data based on user interaction with a first GUI input element of the GUI input elements; based on the input data, searching image metadata for a set of images for inclusion in the presentation, the image metadata comprising data for a set of individuals depicted in the set of images, the data generated from classification information stored on computer storage and provided by the set of individuals depicted in the set of images, the search identifying first data in a portion of the image metadata that corresponds to the input data received based on the user interaction with the first GUI input element; identifying second data in the portion of the metadata that corresponds to the input data; rendering a second GUI input element of the GUI input elements based, at least in part, on the second data; locating an image from the set of images using the portion of the image metadata; and retrieving the image from the computer storage, the image to be displayed by the GUI.

In at least one embodiment, the computer-implemented method further includes adjusting the presentation to include the image retrieved from the computer storage.

In at least one embodiment, the set of images includes one or more images collected based on metrics data.

In at least one embodiment, the metrics data comprises data generated from presentations including the set of images.

In at least one embodiment, the input data comprises a percentage value, and rendering the second GUI input element of the GUI input elements includes generating a second input value comprising another percentage value.

In at least one embodiment, one or more of the GUI input elements is an adjustable GUI input element, the adjustable GUI input element to adjust one or more attribute associated with one or more individuals depicted in the presentation.

In at least one embodiment, a non-transitory computer-readable storage medium having stored thereon executable instructions that, if executed by one or more processors of a computer system, cause the computer system to at least: provide a graphical user interface (GUI) comprising GUI input elements, each GUI input element of the GUI input elements associated with a different attribute of an individual to be depicted in a presentation; receive input data based on user interaction with a first GUI input element of the GUI input elements; based on the input data, search image metadata for a set of images for inclusion in the presentation, the image metadata comprising data for a set of individuals depicted in the set of images, the data generated from classification information stored in files stored in computer storage and provided by the set of individuals depicted in the set of images, the search identifying first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer storage, the image to be displayed by the GUI.

16. The non-transitory computer-readable storage medium of claim 15, wherein the presentation is comprised in one or more media.

In at least one embodiment, the executable instructions that, if executed by one or more processors of a computer system, cause the computer system to at least update the presentation to include the image retrieved from the computer storage.

In at least one embodiment, the set of images includes one or more images collected based on metrics data.

In at least one embodiment, the metrics data comprises data associated with presentations including the set of images.

In at least one embodiment, one or more of the GUI input elements is an adjustable GUI element, the adjustable GUI element to adjust one or more attributes associated with one or more individuals depicted in the presentation.

In at least one embodiment, a system includes one or more processors; and memory that stores computer-executable instructions that, as a result of execution by the one or more processors, cause the system to at least: analyze first image metadata to identify first classification information pertaining to a first set of individuals depicted in a computer-implemented presentation of images, the first image metadata generated using a neural network to determine the first classification information; generate first data based on the first classification information, the first data including first attributes pertaining to the first set of individuals generated from analysis of the first classification information; compare the first data against a set of alphanumeric characters defining one or more criteria for presentations of imagery including individuals; based on the comparison of the first data against the set of alphanumeric characters defining one or more criteria for presentations of imagery including individuals, determine one or more of the first attributes pertaining to the first set of individuals is out of compliance with the set of alphanumeric characters defining one or more criteria for presentations of imagery including individuals; query a database including second image metadata linked to a set of images available to be included in the computer-implemented presentation of the images, the set of images collected based on metrics data generated from evaluating prior presentations including the images in the set of images, the second image metadata comprising second data for a second set of individuals depicted in the set of images, the second data generated from second classification information stored in digital files hosted on computer-implemented storage and provided by the second set of individuals depicted in the set of images, the querying including locating second attributes, included in the second data, pertaining to the individuals in the second set of images that comply with the set of alphanumeric characters defining one or more criteria for presentations of imagery including individuals; retrieve an image from the set of images, the image linked to the second attributes pertaining to the individuals in the second set of images that comply with the set of alphanumeric characters defining one or more criteria for presentations of imagery including individuals; and modify the computer-implemented presentation of images to include the retrieved image.

In at least one embodiment, the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising threshold information pertaining to one or more of gender, race, ability, or age of individuals depicted in presentations of imagery including individuals.

In at least one embodiment, the second classification information stored in digital files and provided by the second set of individuals comprises demographics information provided by the second set of individuals, the demographics information provided by the second set of individuals comprising one or more of gender, race, ability, or age information.

In at least one embodiment, the computer-implemented presentation of images is comprised in one or more advertisements to be presented via social media, online advertising, television, or print media, and modifying the computer-implemented presentation of images to include the retrieved image comprises modifying the one or more advertisements to include the retrieved image.

In at least one embodiment, a computer-implemented method includes generating first data based on first classification information pertaining to a first set of individuals depicted in a computer-implemented presentation of images, the first data comprising one or more first attributes pertaining to the first set of individuals depicted in the computer-implemented presentation of images; comparing the first data against one or more criteria for presentations of imagery including individuals; determining a compliance condition based on a result of comparing the first data against the one or more criteria for presentations of imagery including individuals; based at least in part on the compliance condition, querying second image metadata linked to a set of images available to be included in the computer-implemented presentation of images, the second image metadata comprising second data for a second set of individuals depicted in the set of images, the second data generated from second classification information stored in computer-implemented storage and at least in part provided by the second set of individuals depicted in the set of images, the querying including locating one or more second attributes, in the second data, pertaining to the individuals in the second set of images that conform to the one or more criteria for presentations of imagery including individuals; and selecting one or more images in the second set of images to be associated with the computer-implemented presentation of images, the selected one or more images associated with the one or more second attributes pertaining to the individuals in the second set of images that conform to the one or more criteria for presentations of imagery including individuals.

In at least one embodiment, the first and second classification information comprises demographic information determined by a machine learning (ML) model trained to determine the demographic information associated with the imagery including individuals.

In at least one embodiment, the one or more first attributes comprise first demographic information comprising one or more of an age information, gender information, or ethnicity information pertaining to the first set of individuals depicted in the computer-implemented presentation of images.

In at least one embodiment, the one or more criteria for presentations of the imagery including individuals comprises one or more threshold values including an age threshold value, a gender threshold value, or an ethnicity threshold value.

In at least one embodiment, the second classification information comprises demographics information provided by the second set of individuals, the demographics information provided by the second set of individuals comprising one or more of gender, race, ability, or age information.

In at least one embodiment, the computer-implemented presentation of images is comprised in one or more advertisements to be presented via social media, online advertising, television, or print media, the method further comprising modifying the computer-implemented presentation of images to include the selected one or more images based on the compliance condition, the compliance condition indicating the one or more first attributes do not comply with the one or more criteria for presentations of imagery including individuals.

In at least one embodiment, the set of images includes one or more images collected based on metrics data generated from evaluating prior presentations including the set of images.

In at least one embodiment, the metrics data comprises data generated based on feedback information determined from dissemination of the prior presentations including the set of images via one or more media accessible to end-users.

In at least one embodiment, a non-transitory computer-readable storage medium having stored thereon executable instructions that, if executed by one or more processors of a computer system, cause the computer system to at least: generate first data based on first classification information pertaining to a first set of individuals depicted in a computer-implemented presentation of images, the first data comprising one or more first attributes pertaining to the first set of individuals depicted in the computer-implemented presentation of images; compare the first data against one or more criteria for presentations of imagery including individuals; determine a compliance condition based on a result of comparing the first data against the one or more criteria for presentations of imagery including individuals; based at least in part on the compliance condition, query second image metadata linked to a set of images available to be included in the computer-implemented presentation of images, the second image metadata comprising second data for a second set of individuals depicted in the set of images, the second data generated from second classification information stored in computer-implemented storage and at least in part provided by the second set of individuals depicted in the set of images, the querying including locating one or more second attributes, in the second data, pertaining to the individuals in the second set of images that conform to the one or more criteria for presentations of imagery including individuals; and select one or more images in the second set of images to be associated with the computer-implemented presentation of images, the selected one or more images associated with the one or more second attributes pertaining to the individuals in the second set of images that conform to the one or more criteria for presentations of imagery including individuals.

In at least one embodiment, the first and second classification information comprises demographic information determined by a machine learning (ML) model trained to determine the demographic information associated with the imagery including individuals.

In at least one embodiment, the one or more first attributes comprise first demographic information comprising one or more of an age information, gender information, and ethnicity information pertaining to the first set of individuals depicted in the computer-implemented presentation of images.

In at least one embodiment, the one or more criteria for presentations of the imagery including individuals comprises one or more threshold values including an age threshold value, a gender threshold value, or an ethnicity threshold value.

In at least one embodiment, the second classification information comprises demographics information provided by the second set of individuals, the demographics information provided by the second set of individuals comprising one or more of gender, race, ability, and age information.

In at least one embodiment, the computer-implemented presentation of images is comprised in one or more advertisements to be presented via social media, online advertising, television, or print media, the method further comprising modifying the computer-implemented presentation of images to include the selected one or more images.

In at least one embodiment, the set of images includes one or more images collected based on metrics data generated from evaluating prior presentations including the set of images.

In at least one embodiment, the metrics data comprises data generated based on feedback information determined from dissemination of the prior presentations including the set of images via one or more media accessible to end-users.

In at least one embodiment, a system includes one or more processors; and memory that stores computer-executable instructions that, as a result of execution by the one or more processors, cause the system to at least: provide a graphical user interface (GUI) comprising GUI input elements, each GUI input element of the GUI input elements associated with a different attribute of an individual to be depicted in a computer-implemented presentation; receive input data based on user interaction with a first GUI input element of the GUI input elements; based on the input data, query a database including image metadata linked to a set of images available to be included in the computer-implemented presentation, the set of images collected based on metrics data generated from evaluating prior presentations including the images in the set of images, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer-implemented storage, the image to be displayed by the GUI.

In at least one embodiment, the first GUI input element is associated with gender and the second GUI input element of the GUI input elements is associated with age.

In at least one embodiment, rendering the second GUI input element based, at least in part, on the second data comprises rendering the second GUI input element based on another attribute comprised in the second data, and the attribute is associated with first demographic information and the other attribute is associated with a second demographic information different than the first demographic information.

In at least one embodiment, the classification information stored in digital files and provided by the set of individuals comprises demographics information provided by the set of individuals, the demographics information provided by the set of individuals comprising one or more of gender, race, ability, or age information.

In at least one embodiment, the memory that stores the computer-executable instructions that, as a result of execution by the one or more processors, further cause the system to at least: render each GUI input element of the GUI input elements based on a plurality of individuals depicted in the computer-implemented presentation; update the computer-implemented presentation to include the image retrieved from the computer-implemented storage; and update the rendering of one or more of the GUI input elements based, at least in part, on the computer-implemented presentation updated to include the image retrieved from the computer-implemented storage.

In at least one embodiment, the metrics data comprises data generated based on feedback information determined from dissemination of the prior presentations including the set of images via one or more media accessible to end-users.

In at least one embodiment, computer-implemented presentation is comprised in one or more advertisements to be presented via social media, online advertising, television, or print media, and the memory that stores the computer-executable instructions that, as a result of execution by the one or more processors, further cause the system to at least modify the computer-implemented presentation to include the image from the computer-implemented storage.

In at least one embodiment, the input data comprises a percentage value associated with demographic information, and rendering the second GUI input element of the GUI input elements includes generating a second input value comprising another percentage value associated with the demographic information.

In at least one embodiment, a computer-implemented method includes providing a graphical user interface (GUI) comprising GUI input elements, each GUI input element of the GUI input elements associated with a different attribute of an individual to be depicted in a computer-implemented presentation; receiving input data based on user interaction with a first GUI input element of the GUI input elements; based on the input data, querying image metadata linked to a set of images available to be included in the computer-implemented presentation, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element; identifying second data in the portion of the metadata that corresponds to the input data; rendering a second GUI input element of the GUI input elements based, at least in part, on the second data; locating an image from the set of images using the portion of the image metadata; and retrieving the image from the computer-implemented storage, the image to be displayed by the GUI.

In at least one embodiment, the computer-implemented method includes rendering each GUI input element of the GUI input elements based on a plurality of individuals depicted in the computer-implemented presentation; updating the computer-implemented presentation to include the image retrieved from the computer-implemented storage; and updating the rendering of one or more of the GUI input elements based, at least in part, on the computer-implemented presentation updated to include the image retrieved from the computer-implemented storage.

In at least one embodiment, the set of images includes one or more images collected based on metrics data generated from evaluating prior presentations including the set of images.

In at least one embodiment, the metrics data comprises data generated based on feedback information determined from dissemination of the prior presentations including the set of images via one or more media accessible to end-users.

In at least one embodiment, the input data comprises a percentage value associated with demographic information, and rendering the second GUI input element of the GUI input elements includes generating a second input value comprising another percentage value associated with the demographic information.

In at least one embodiment, one or more of the GUI input elements is a GUI slider, the GUI slider is user adjustable to modify one or more of gender, race, ability, or age associated with one or more individuals depicted in the computer-implemented presentation.

In at least one embodiment, a non-transitory computer-readable storage medium having stored thereon executable instructions that, if executed by one or more processors of a computer system, cause the computer system to at least: provide a graphical user interface (GUI) comprising GUI input elements, each GUI input element of the GUI input elements associated with a different attribute of an individual to be depicted in a computer-implemented presentation; receive input data based on user interaction with a first GUI input element of the GUI input elements; based on the input data, query image metadata linked to a set of images available to be included in the computer-implemented presentation, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer-implemented storage, the image to be displayed by the GUI.

In at least one embodiment, the computer-implemented presentation is comprised in one or more advertisements to be presented via social media, online advertising, television, or print media, the executable instructions that, if executed by one or more processors of the computer system, cause the computer system to further at least modify the computer-implemented presentation to include the retrieved image.

In at least one embodiment, the executable instructions that, if executed by one or more processors of a computer system, cause the computer system to at least: rendering each GUI input element of the GUI input elements based on a plurality of individuals depicted in the computer-implemented presentation; update the computer-implemented presentation to include the image retrieved from the computer-implemented storage; and update the rendering of one or more of the GUI input elements based, at least in part, on the computer-implemented presentation updated to include the image retrieved from the computer-implemented storage.

In at least one embodiment, the set of images includes one or more images collected based on metrics data generated from evaluating prior presentations including the set of images.

In at least one embodiment, the metrics data comprises data generated based on feedback information determined from dissemination of the prior presentations including the set of images via one or more media accessible to end-users.

In at least one embodiment, one or more of the GUI input elements is a GUI slider, the GUI slider is user adjustable to modify one or more of gender, race, ability, and age associated with one or more individuals depicted in the computer-implemented presentation.

FIG. 1 illustrates an example of a system environment 100 to provide access to and allow modification of one or more computer-implemented presentations 102 of images, in accordance with an embodiment. The one or more computer-implemented presentations 102 of images can include one or more customer journey frameworks featuring imagery. In at least one embodiment, a customer journey framework is a set of experiences and interactions that a customer goes through when engaging with a brand, product, or service from start to finish. Such a framework can encompass one or more touchpoints a customer has, from their initial discovery of the brand to post-purchase interactions, including any follow-up or support. In some examples, a customer journey framework can include one or more images used in social media advertisements, one or more images used in advertisements on websites, one or more images used in print media, and/or one or more images used in video displayed on television or a streaming service. Additionally, the one or more computer-implemented presentations 102 of images can include one or more advertisements. These one or more advertisements can be used in the same manner described with reference to the customer journey framework.

As illustrated, a user may operate a computing device 104, which may be any type of computing device, such as a laptop, desktop, thin client, or mobile computing device (e.g., a smart phone). The computing device 104 can display a presentation graphical user interface (GUI) 106. In at least one embodiment, the presentation GUI 106 can be used by the user of the computing device 104 to display the presentation 102 of a set of images 108. The set of images 108, as shown in the system environment 100, can feature one or more individuals, and the presentation 102 of the set of images 108 can be a video presentation, a slideshow of images, a set of images for inclusion in print media, a set of images for inclusion in web-based presentations, a set of images for use in one or more advertisements, and so forth. In the example shown, the set of images 108 includes a younger woman sitting in a chair, an older adult man, and a younger man playing golf.

Display of the presentation GUI 106 using the computing device 104 can be caused by an imagery management system 110 of the system 100. In at least one embodiment, the imagery management system 110 includes a presentation server 112. In at least one embodiment, the presentation server 112 includes but is not limited to a central processing unit (CPU) configured to execute instructions; memory components, such as volatile and non-volatile memory, for storing data and program code; and network interface hardware that facilitates communication over wired or wireless networks. The server 112 also encompasses one or more storage devices, such as hard drives or solid-state drives, to maintain data persistence and retain databases, software applications, or multimedia content. Additionally, the server 112 may incorporate a graphics processing unit (GPU) or other specialized co-processors to perform accelerated computations and support complex graphical processing. The server's 112 software architecture includes an operating system (OS) and may feature virtualization layers or containerization software to manage resource allocation, improve scalability, and support multi-tenant environments. The server 112 can execute server-based applications, facilitate data processing, respond to client requests, and manage security protocols, including encryption and access control, ensuring secure and efficient operations of the presentation GUI 106.

In at least one embodiment, the presentation server 112 serves as an intermediary layer between backend data, such as image data and other metadata, and the presentation GUI 106, thus allowing images, videos, or other visuals to display smoothly within the presentation GUI 106. In at least one embodiment, the presentation server 112 ensures that imagery is rendered properly, efficiently, and interactively, based on user inputs and system requirements, within the presentation GUI 106. The presentation GUI 106 can include user controls 114. The user controls can include, but are not limited to, a play/pause toggle configured to initiate or suspend playback, a stop button for terminating playback and resetting media to the starting position, and a seek bar allowing users to select specific playback points via a timeline interface. Additional controls include next and previous buttons for navigating sequentially through media files, and rewind/fast-forward buttons enabling accelerated review in forward or backward directions. Volume controls adjust audio output levels, incorporating mute functionality to silence playback when activated. A full-screen toggle can adjust the display to either full-screen mode or windowed view, and playback speed controls allow users to modify video speed between preset options, such as 0.5× to 2× normal speed. The presentation GUI 106 may further include a quality selector for adjusting video resolution based on network conditions or device capabilities, a subtitle or closed caption toggle to enable text-based transcriptions in multiple languages, and a Picture-in-Picture (PiP) mode control, facilitating playback within a floating overlay on the screen. A settings menu may be provided to access advanced features, including playback preferences, audio language options, and additional display settings, thereby offering an enhanced, interactive user experience for multimedia consumption.

In at least one embodiment, the user controls 114 includes an evaluation control 116. In an example, a user can select the evaluation control 116 to cause the presentation server 112 to evaluate the presentation 102 of a set of images 108 based on a policy 118 of the imagery management system 110. The policy 118 can be stored in one or more computer-implemented storages of a computer storage system 120 of the imagery management system 110. The computer storage system 120 can also include images 122 and presentations 124. The presentations 124 can be displayed using the presentation GUI 106. In some embodiments, the images 122 can be used to create and/or modify the presentations 124. In at least one embodiment, the presentation 102 is included in the presentations 124. The computer storage system 120 can include various types of storage, such as volatile and non-volatile storage media, configured to retain and manage data for processing and retrieval. Volatile storage, including but not limited to Random Access Memory (RAM), serves as temporary storage that facilitates rapid data access and modification while a system is powered on. Non-volatile storage options, such as Hard Disk Drives (HDDs) and Solid-State Drives (SSDs), are configured to persist data even when the system 110 is powered off, enabling long-term data retention and high-capacity storage. Additionally, the storage system 120 may comprise removable media, including optical discs (CDs, DVDs), Universal Serial Bus (USB) drives, and memory cards, offering portability for data transfer across systems. Network-attached storage (NAS) and cloud-based storage solutions may also be included to provide scalable, remote data storage options, facilitating access and backup from multiple devices over a network. The storage system 120 may further incorporate a hierarchy of storage tiers, such as cache storage for frequently accessed data and archival storage for rarely accessed data, optimizing data access speeds and resource management based on application requirements. Each storage type serves a distinct function within the computer storage system 120, collectively ensuring efficient, reliable, and flexible data handling for varied computing tasks.

In at least one embodiment, the images 122 available for inclusion in the presentations 124 can be selected based on metrics data generated from their prior use, such as in presentations, advertising, and/or frameworks. This metrics data can be derived from evaluating how the presentations/frameworks were utilized. For instance, the metrics data may be generated from positive feedback provided by the audience of the presentations 124 previously disseminated. In various embodiments, metrics data collected to analyze the success or failure of the presentations 124 across online, TV, and print media include reach and impression data, engagement and interaction metrics, conversion and sales impact indicators, brand awareness and sentiment metrics, cost and efficiency metrics, and frequency-related data. Reach and impression metrics track the total exposure to unique viewers, while engagement metrics capture user interactions, such as click-through rates, social media shares, and viewer response. Conversion data includes conversion rates and sales impact to measure the effectiveness of driving desired actions, while brand-related metrics, such as brand lift surveys and sentiment analysis, assess audience perception and recall. Cost efficiency is determined through metrics like cost per thousand impressions (CPM) and return on advertising spend (ROAS), which measure advertising spend relative to impact. Additionally, frequency data measures exposure rates to prevent viewer fatigue and maximize retention, informing optimal ad placement and timing across media channels.

In at least one embodiment, the policy 118 outlines guidelines and standards for how individuals and groups are depicted in marketing materials. A goal of the policy 118 is to ensure that representations in advertisement frameworks and/or customer journey frameworks are diverse, inclusive, and respectful. For example, the policy 118 can be used to ensure that the frameworks reflect a wide range of identities, including different races, genders, ages, abilities, sexual orientations, and cultural backgrounds. Additionally, the policy 118 can be put in place to ensure inclusivity by considering how various audiences may engage with advertisements. In some examples, the policy 118 can be used to establish a process for reviewing the frameworks to ensure they meet representation standards, and create mechanisms for accountability and feedback. The presentation 102 can be evaluated against the policy 118 to determine the presentation 102 complies with the representation criteria outlined in the policy 118. These criteria can be specifically tailored to assess representation in imagery of the presentation 102. Consequently, the policy 118 can include demographic categories for analysis, such as race, gender, age, ability, sexual orientation, and cultural background. In some instances, one or more criteria may encompass relevant subcategories within each demographic category to enhance specificity, such as ethnic groups and gender identities. Additionally, the policy 118 can include metrics for assessing representation, such as the percentages of individuals from various demographic groups. The policy 118 may also establish one or more thresholds (e.g., threshold values) for demographic representation to ensure a minimum level of diversity is achieved in the presentation 102. In at least one embodiment, evaluation of the presentation 102 based on the policy 118 is triggered when a user selects the control 116.

Evaluation of the presentation 102 based on the policy 118 can include assessing the metadata of images used in the presentation 102 to identify classification information for individuals depicted in those images. In at least one embodiment, the metadata of the images is included in image metadata 125 of the imagery management system 110. In at least one embodiment, the image metadata 125 is hosted by one or more database systems of the imagery management system 110. As described, the classification information of the image metadata 125 may include attributes related to gender, race, ability, and age of the individuals depicted. In at least one embodiment, the image metadata 125 can include demographic information for the individuals depicted in images 122. The demographic information can identify characteristics such as gender, race, ability, and/or age of the individuals shown. This information can be directly provided by the individuals depicted in the images 122. In some cases, the demographic information is provided by the individuals and then stored electronically in one or more digital files hosted by the imagery management system 110.

The identified classification information can be compared against the representation criteria outlined in the policy 118. This comparison can be used to determine if the imagery used in the presentation 102 complies (e.g., conforms) with the representation criteria set forth in the policy 118. Noncompliance of the imagery may prompt the described techniques and systems to modify the presentation 102 to include additional imagery featuring individuals with attributes that bring the noncompliant frameworks into alignment with the policy 118. In at least one embodiment, the additional imagery can be obtained from the images 122 of the computer storage system 120. Alternatively or in addition, noncompliance may lead the described techniques and systems to modify the presentation 102 by removing imagery featuring individuals in an effort to achieve compliance with the policy 118. In some examples, noncompliance may lead to the described techniques and systems to modify the presentation 102 by removing imagery from the presentation 102 and adding new imagery to the presentation 102 to achieve compliance with policy 118. In at least one embodiment, the imagery and management system 110 coupled with the presentation server 112 can perform the described modifications of the presentation 102 in accordance with a determined noncompliance of the presentation 102 based on the policy 118.

In at least one embodiment, the policy 118 may include thresholds related to gender, race, ability, and/or age for individuals depicted in the imagery of the presentations 124. Such thresholds can include a set of alphanumeric characters and/or threshold values defining one or more criteria for presenting imagery that includes individuals. Evaluation of the imagery used in the presentation 102—based at least in part on the metadata and the policy 118—can reveal that the imagery does not satisfy the policy criteria for representations involving individuals. For instance, the evaluation of the policy 118 might show insufficient representation of individuals of a certain gender, race, ability, and/or age. This determination can prompt the presentation server 112 to identify, using the information and metadata, at least one image from the available set of images 122 that can be incorporated into a non-compliant presentation, such as the presentation 102. The selected image can then be added to the presentation 102 and reevaluated based on the policy 118 to determine if the presentation 102 is now in compliance.

Figure 2:
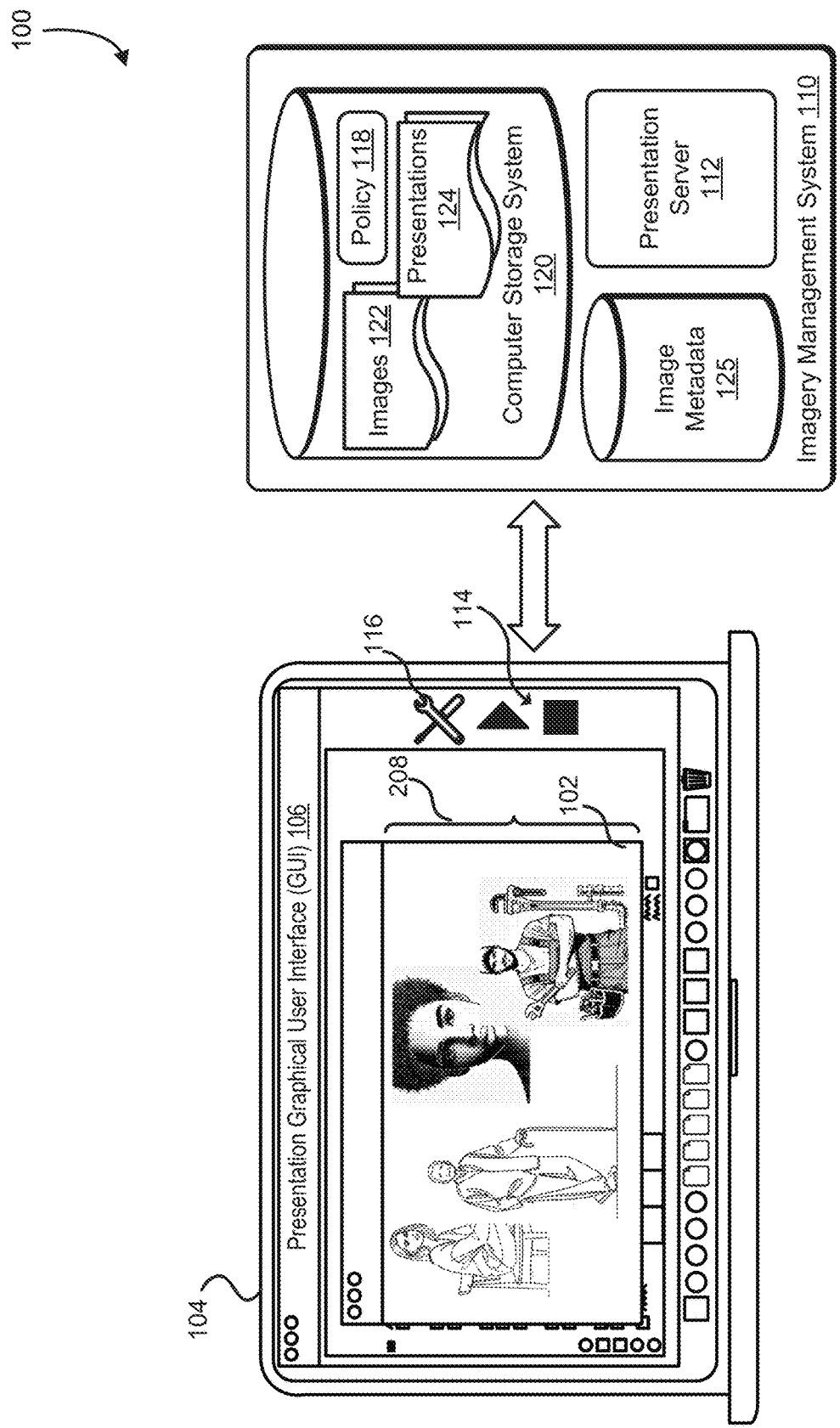
FIG. 2 illustrates the system environment to provide access to and allow modification of one or more computer-implemented presentations of images, in accordance with an embodiment.

FIG. 2 illustrates an example of the system environment 100 to provide access to and allow modification of one or more computer-implemented presentations of images, in accordance with an embodiment. As illustrated in FIG. 2, the presentation 102 is updated to include of a set of images 208. In at least one embodiment, the presentation 102 is updated to include the set of images 208 based on an evaluation of the presentation 102 including the set of images 108 against the policy 118. In an example, the evaluation process triggered the imagery management system 110 to cause the presentation server 112 to select additional images for inclusion in the presentation 102. In addition, or alternatively, the evaluation process can trigger the imagery management system 110 to cause the presentation server 112 to remove one or more images from the presentation 102. In some embodiments, the evaluation process can trigger the imagery and management system 110 to cause the presentation server 112 to add one or more images to the presentation 102 and remove one or more images from the presentation 102. In the example shown in FIG. 2, the presentation 102 is modified, based on evaluation of the policy 118, to include an image from the images 122 of a plumber and an image from the images 122 of a Black woman. Furthermore, in the example shown in FIG. 2, the presentation 102 is modified, based on evaluation of the policy 118, to remove the image of a male golfer.

In at least one embodiment, the presentation 102 is modified to include an image of an individual identified as a Black woman, where the modification is performed based on a determination from the policy 118 that the presentation 102, prior to modification, fails to meet a race threshold as defined by the policy 118. In at least one embodiment, the race threshold is defined as a percentage value. In a further example, the presentation 102 is modified to include an image of an individual identified as a plumber, where the modification is based on a determination from the policy 118 that the presentation 102, prior to modification, fails to satisfy an ability threshold as specified by the policy 118. In at least one embodiment, the ability threshold comprises a percentage value indicating a minimum representation percentage for individuals depicted in one or more work-related fields.

Figure 3:
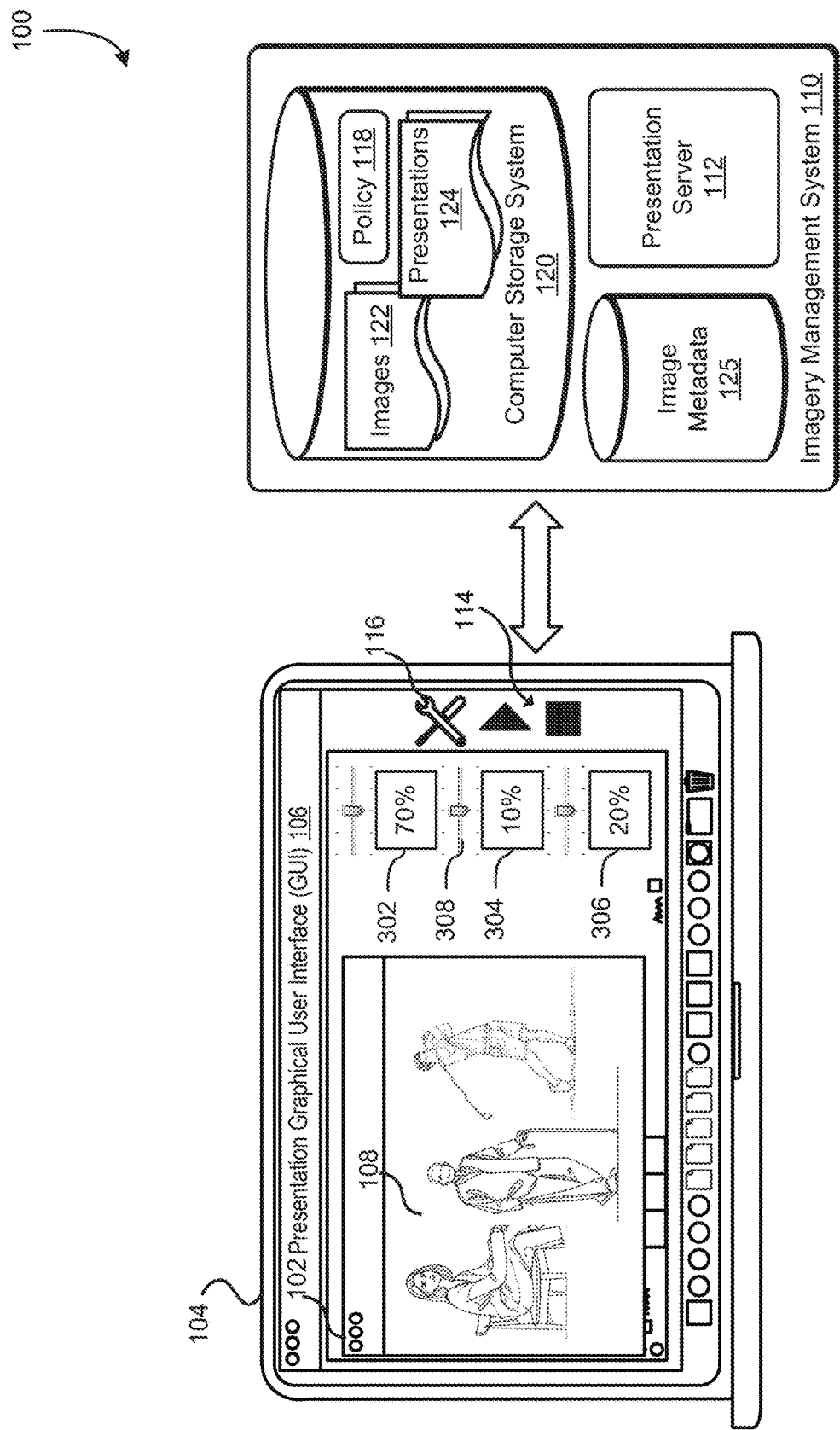
FIG. 3 illustrates the example of the system environment to provide access to and allow modification of one or more computer-implemented presentations of images, in accordance with an embodiment.

FIG. 3 illustrates the example of the system environment 100 to provide access to and allow modification of one or more computer-implemented presentations of images, in accordance with an embodiment. The presentation GUI 106 can include one or more GUI input elements to allow a user to modify or generate a presentation. For example, the one or more GUI input elements, as discussed in the foregoing, can be used to modify a set of images for a presentation and/or can be used to select a set of images for a presentation.

In at least one embodiment, the GUI interface 106 includes a gender GUI input element 302, a race GUI input element 304, and an age GUI input element 306. The GUI interface 106 can include additional, alternative, or fewer GUI input elements or combinations thereof. Additionally, these GUI input elements may be associated with various attributes of an individual, such as demographic details including age information, gender information, ethnicity information, ability information, and the like.

In some embodiments, the GUI input elements 302, 304, and 306 are populated with values, such as percentages, based on analysis of presentation 102 performed by presentation server 112. For example, the presentation server 112 can analyze metadata associated with the set of images 108 in presentation 102. In particular, for each image in the set of images 108, presentation server 112 can analyze associated image metadata 125 to determine classification information for the set of images 108. The classification information determined from image metadata 125 can include attributes pertaining to individuals depicted in the set of images 108. Based on the attributes pertaining to individuals depicted in the set of images 108, the presentation server 112 dynamically populates GUI input elements 302, 304, and 306. In an embodiment, the presentation server 112 aggregates demographic data associated with each metadata 125 associated with each image in the set of images 108 to calculate overall statistics for the entire set of images 108. In at least one embodiment, the presentation server 112 compiles metrics such as percentage distribution of gender, race, ability, and/or age categories, providing an overall demographic profile of the set of images 108 used in presentation 102. This percentage distribution of gender, race, ability, and/or age categories is then used to populate GUI input elements 302, 304, and 306. In at least one embodiment, the presentation server 112 can the aggregate the demographic data, determined from the image metadata 125 linked to the set of images 108 of the presentation 102, to calculate overall statistics for the set of images 108. In some examples, the presentation server 112 can generate a GUI report or GUI dashboard displaying the demographic statistics for the set of images 108. These metrics can be used to evaluate diversity representation or inform adjustments to ensure the dataset meets any diversity or inclusion standards. In addition, in at least one embodiment, these metrics can be compared against the policy 118 to determine if the presentation 102 complies (e.g., conforms) with criteria of the policy 118.

One or more of the GUI input elements 302, 304, and 306 can have an associated slider 308. The slider 308 can be used to adjust a percentage related to demographic data, such as gender, race, age, or ability. Adjustment of the slider 308 for an associated one of the GUI input elements 302, 304, or 306 can cause the presentation server 112 to dynamically adjust the representation of different demographic groups within the set of images 108. As a user moves the slider 308, the presentation server 112 analyzes the current composition of demographic groups in the set of images 108. In at least one embodiment, adjustment of the slider 308 causes the presentation server 112 to dynamically adjust which images are included in the set of images 108 and displayed in the presentation 102 to better match the selected demographic percentage. For example, if the user increases the race GUI input element 304 percentage, the presentation server 112 can analyze image metadata 125 and replace or add images in the set of images 108 to feature individuals with diverse race related physical characteristics to balance the gender distribution in the set of images 108, according to the slider setting.

Figure 4:
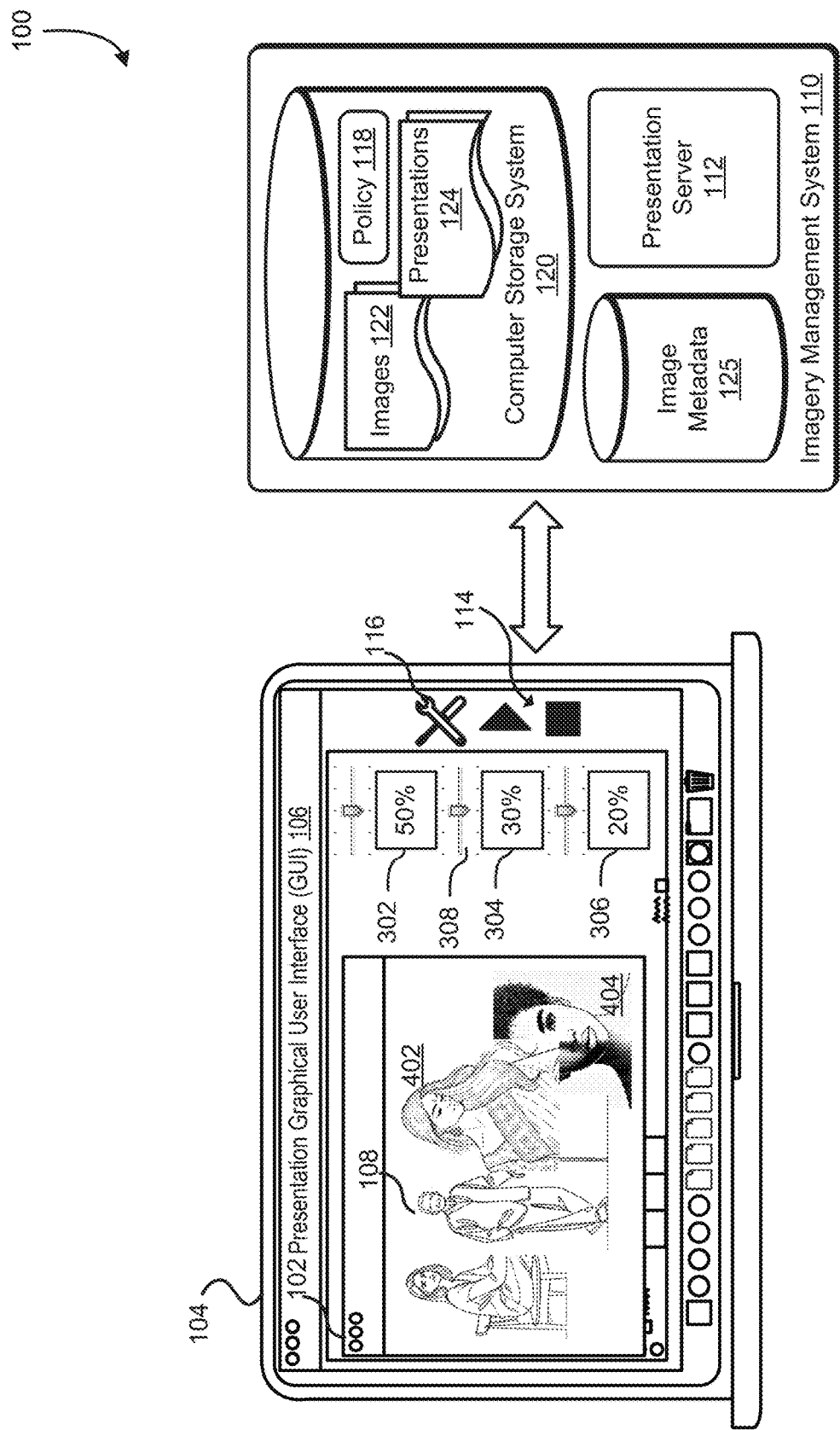
FIG. 4 illustrates the system environment to provide access to and allow modification of one or more computer-implemented presentations of images, in accordance with an embodiment.

FIG. 4 illustrates the example of the system environment 100 to provide access to and allow modification of one or more computer-implemented presentations of images, in accordance with an embodiment. In this example of the system environment 100, the user adjusts the race GUI input element 304 to increase the percentage from 10% to 30%. In at least one embodiment, the user manually replaces the 10% value with the 30% value by way of interaction with the GUI input element 304. In another example, the user manipulates the slider 308 associated with the GUI input element 304 to adjust the percentage.

In at least one embodiment, the presentation server 112, in response to the increase in the percentage from 10% to 30% in the GUI element 304, identifies one or more images from the images 122 based on the image metadata 125 and dynamically adjusts which images are included in the set of images 108 and displayed in the presentation 102 to better match the selected demographic percentage. For example, in at least one embodiment, the percentage adjustment causes the presentation server 112 to select images 402 and 404 for inclusion in the set of images 108. Correspondingly, in at least one embodiment, the presentation server 112 dynamically adjusts one or more percentages of the GUI input elements 302 and 306, respectively, based on the user's adjustment of the percentage value in the GUI input element 304.

Figure 5:
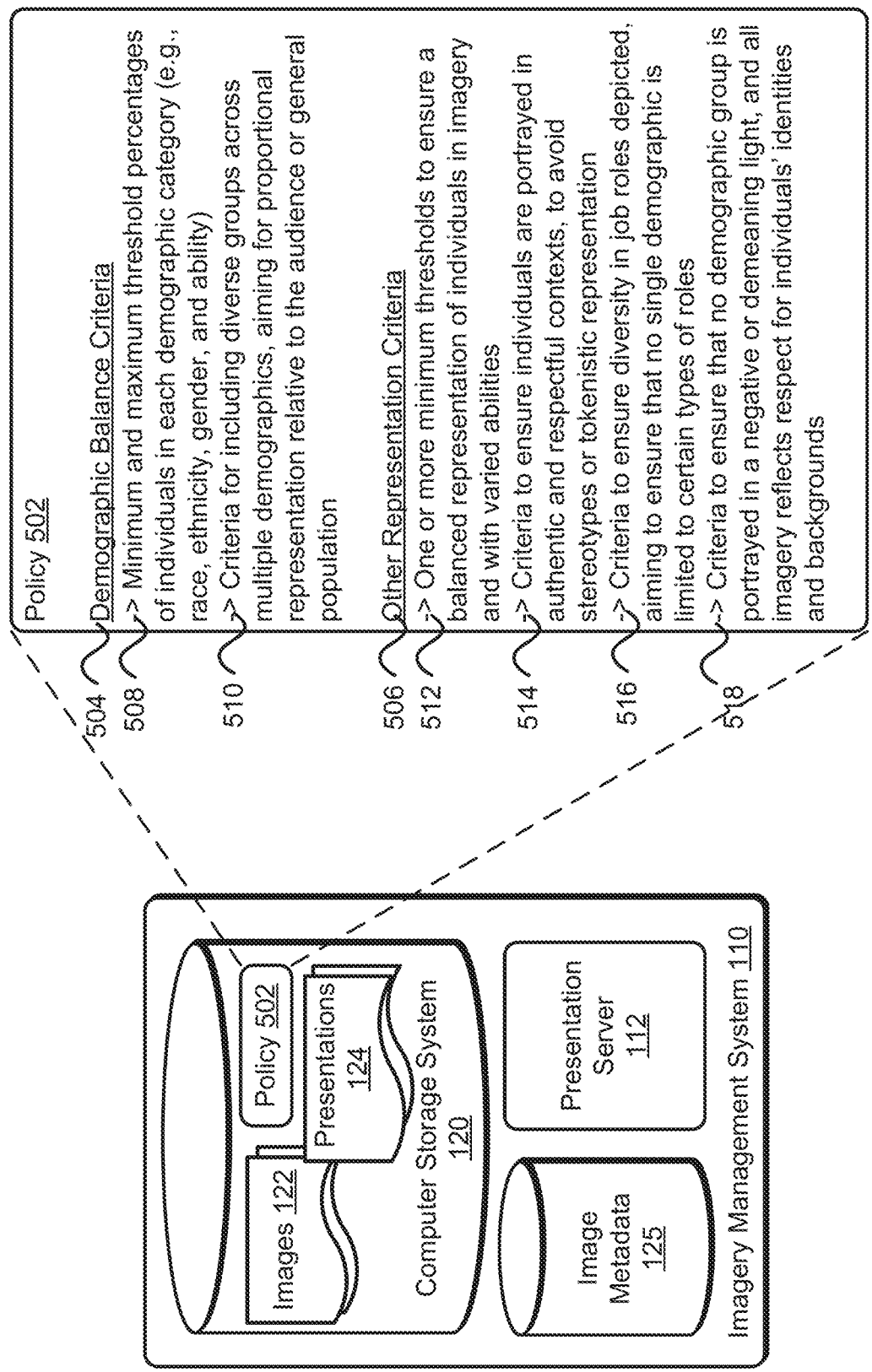
FIG. 5 illustrates a policy that can be implemented by a system to evaluate one or more computer-implemented presentations of images, in accordance with an embodiment.

FIG. 5 illustrates a policy 502 that can be implemented by the system environment 100 to evaluate one or more computer-implemented presentations of images, in accordance with an embodiment. In at least one embodiment, the policy 118 includes some or all of the policy 502. In at least one embodiment, the policy 502 for the presentations 124 featuring images or video of individuals is designed to ensure compliance with ethical, legal, and organizational standards by establishing comprehensive guidelines for the inclusion and portrayal of individuals in visual content. In at least one embodiment, the criteria of policy 502 can reflect the importance of accurately representing individuals in a manner that promotes inclusivity and diversity, explicitly prohibiting the use of imagery that reinforces stereotypes, biases, or discriminatory representations. To facilitate compliance, the policy 502 can provide specific criteria that images and videos of the presentations 124 should meet, including the necessity for contextual relevance to the presentation's objectives and the adherence to established quality standards in terms of resolution, clarity, and professionalism. In at least some embodiments, the policy 502 can include criteria related to the image metadata 125 associated with images and videos, such as information regarding any pertinent demographic details to assess compliance with diversity and inclusivity standards.

In at least one embodiment, the policy 502 is designed to ensure that demographic metadata (e.g., demographic information of the image metadata 125) associated with each image used in a presentation—including race, ethnicity, gender, job role, and ability—complies with predefined standards for ethical, balanced, and inclusive representation. In an example, the policy 502 defines specific demographic balance guidelines, setting minimum and maximum thresholds and/or ratios to achieve proportional representation across multiple demographic categories, thereby ensuring diversity within presentations 124. Ethical representation criteria of the policy 502 can mandate the authentic and respectful portrayal of individuals, promoting diversity in roles depicted and avoiding stereotypical or tokenistic portrayals. Furthermore, the policy 502 can require metadata verification, for some or all of the image metadata 125 to confirm the accuracy of demographic data, enabling automated and manual review of images for compliance with these standards. At least some embodiments, the policy 502 can include contextual use guidelines to ensure each image of a presentation aligns with the presentation topic, audience, and organizational values, with specific provisions for handling sensitive demographics to prevent misuse. An automated review mechanism, such as by way of the presentation server 112, can evaluate metadata against criteria of the policy 502, flagging non-compliant presentations for manual review and/or automated updating of the presentations to include a revised set of images. The policy 502 can also include criteria facilitating presentation alignment with brand standards and ethical principles, ensuring that no demographic group is portrayed negatively in the presentations 124. In at least one embodiment, the policy 502 includes contextualized criteria for evaluating one or more images used in one or more of the presentations 124. The contextualized criteria can be processed by one or more neural networks of the presentation server 112 to determine a compliance status (i.e., in compliance or noncompliance) of one or more presentations of the presentations 124. In at least one embodiment, the one or more neural networks can be trained, at least in part, using the image metadata 125. This training of the one or more neural networks can enable the presentation server 112 to properly and accurately assess compliance of one or more of the presentations 124 based on the criteria defined in the policy 502.

In at least one embodiment, the policy 502 can include demographic balance criteria 504 and other representation criteria 506. In at least one embodiment, the demographic balance criteria 504 and the other representation criteria 506 can be one or more quantifiable policy criteria and/or one or more qualitative policy criteria. In at least one embodiment, quantifiable policy criteria can include policy data or information that can be calculated, verified, or validated automatically. Examples of such quantifiable policy criteria can include, for example, numerical standards or percentage values and thresholds. In at least one embodiment, qualitative policy criteria can include subjective criteria that can be processed by one or more natural language processing tools and/or machine learning models. In at least one embodiment, the criteria of the demographic balance criteria 504 can include: 508 minimum and maximum threshold percentages of individuals in each demographic category (e.g., race, ethnicity, gender, and ability); and 510 criteria for including diverse groups across multiple demographics, aiming for proportional representation relative to the audience or general population. In an example, the criteria for other representation criteria 506 can include: 512 one or more minimum thresholds to ensure a balanced representation of individuals and imagery and with varied abilities; 514 criteria to ensure individuals are portrayed in authentic and respectful contexts to avoid stereotypes or tokenistic representation; 516 criteria to ensure diversity in job roles depicted, aiming to ensure that no single demographic is limited to certain types of roles; and 518 criteria to ensure that no demographic group is portrayed in a negative or demeaning light, and all imagery reflects respect for individuals' identities and backgrounds.

In at least one embodiment, the policy 502 can be implemented in a structured format. For example, a structured JSON format representing the information of the policy 502 can be used for the policy 502. For example, the policy 502 can be structured as shown:

```
{
  "policy_id": "001",
  "policy_name": "Demographic and Representation Compliance Policy",
  "categories": [
    {
      "category_name": "Demographic Balance Criteria",
      "guidelines": [
        {
          "rule_id": "DB001",
          "description": "Minimum and Maximum Threshold Percentages for Demographic Categories",
          "parameters": {
            "fields": ["race", "ethnicity", "gender", "ability"],
            "thresholds": {
              "minimum_percentage": 10,
              "maximum_percentage": 50
            }
          },
          "notes": "Establishes demographic balance with specified minimum and maximum representation percentages for each category."
        },
        {
          "rule_id": "DB002",
          "description": "Proportional Representation of Diverse Groups",
          "parameters": {
            "requirement": "proportional_representation",
            "reference_population": "audience_or_general_population"
          },
          "notes": "Aims to include demographic diversity proportional to the presentation's audience or the general population."
        }
      ]
    },
    {
      "category_name": "Other Representation Criteria",
      "guidelines": [
        {
          "rule_id": "OR001",
          "description": "Minimum Representation Thresholds for Individuals with Varied Abilities",
          "parameters": {
            "field": "ability",
            "minimum_threshold": 10
          },
          "notes": "Sets a minimum representation level for individuals with diverse abilities."
        },
        {
          "rule_id": "OR002",
          "description": "Authentic and Respectful Contexts for Portrayals",
          "parameters": {
            "prohibited_content": ["stereotypes", "tokenism"],
            "required_context": ["authentic", "respectful"]
          },
          "notes": "Ensures portrayals are respectful and avoid stereotypical or tokenistic representations."
        },
        {
          "rule_id": "OR003",
          "description": "Diversity in Job Roles",
          "parameters": {
            "field": "job_role",
            "requirements": {
              "role_diversity": true,
              "demographic_inclusivity": true
            }
          },
          "notes": "Ensures that various job roles are depicted across demographics, with no single demographic restricted to specific roles."
        },
        {
          "rule_id": "OR004",
          "description": "Respectful and Positive Depictions",
          "parameters": {
```

```
        "fields": ["race", "ethnicity", "gender", "ability"],
        "prohibited_tone": ["negative", "demeaning"]
      },
      "notes": "Prevents any demographic group from being portrayed negatively,
ensuring respect for all identities."
    }
   ]
  }
 ]
}
```

Figure 6:
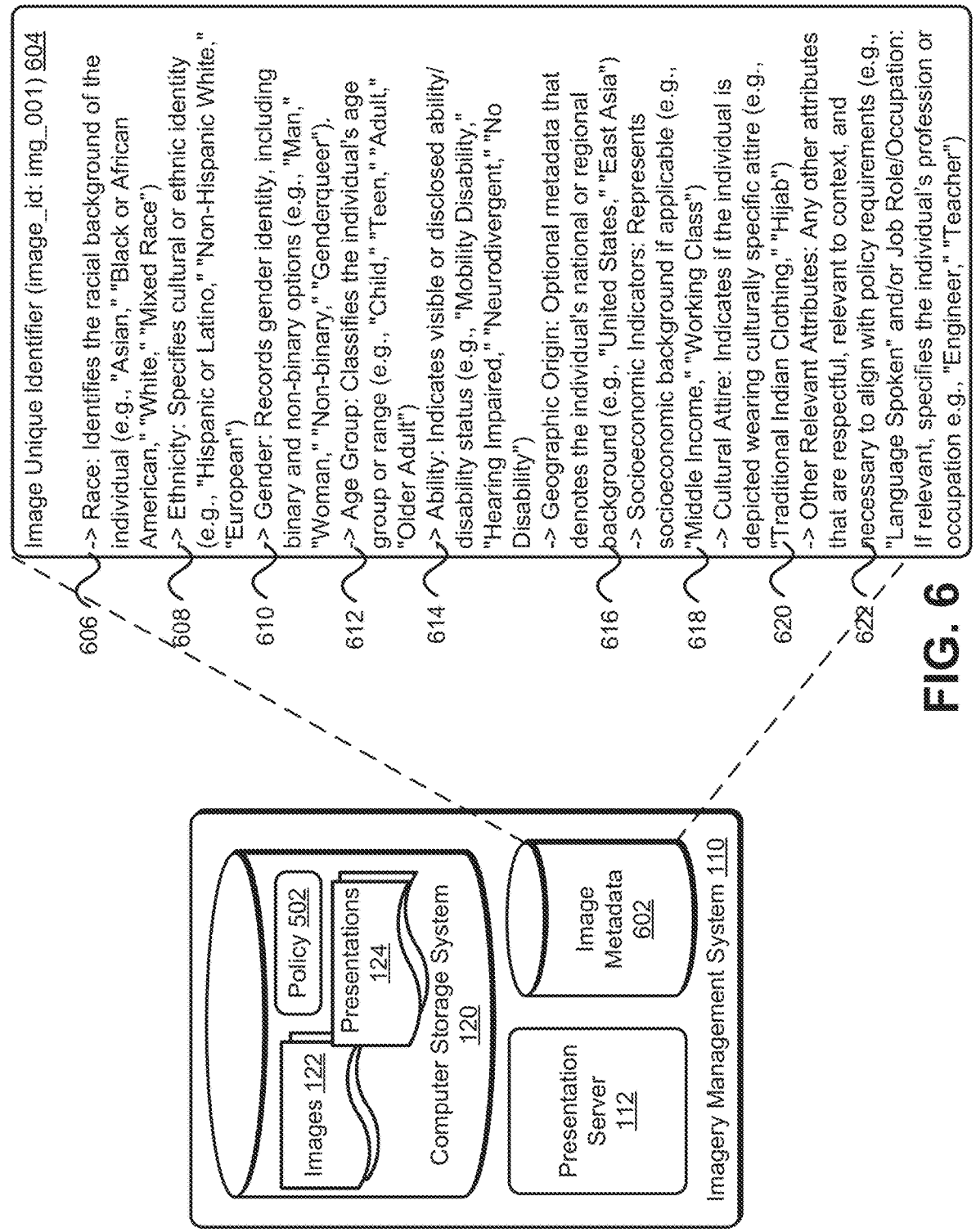
FIG. 6 illustrates image metadata that can be implemented by the system environment to evaluate one or more computer-implemented presentations of images, in accordance with an embodiment.

FIG. 6 illustrates image metadata 602 that can be implemented by the system environment 100 to evaluate one or more computer-implemented presentations of images, in accordance with an embodiment. In at least one embodiment, the image metadata 125 includes some or all of the image metadata 602. The image metadata 602 about individuals depicted in imagery, including some or all of the images 122, can include various types of demographic information to ensure accurate and respectful representation in alignment with organizational or regulatory guidelines, such as the guidelines and criteria of the policy 502. The types of demographic information that may be included in the image metadata 602 can include, in some examples, some or all of the following: an image unique identifier 604 of an associated image; 606 race: identifies the racial background of the individual (e.g., "Asian," "Black or African American," "White," "mixed race"); 608 ethnicity: specifies cultural or ethnic identity (e.g., "Hispanic or Latino," "non-Hispanic White," "European"); 610 gender: records gender identity, including binary and non-binary options (e.g., "Man," "Woman," "non-binary," "genderqueer"); 612 age group: classifies the individual's age group or range (e.g., "child," "teen," "adult," "older adult"); 614 ability: indicates visible or disclosed ability/disability status (e.g., "mobility disability," "hearing impaired," "neurodivergent," "no disability"); 616 geographic origin: optional metadata that denotes the individual's national or regional background (e.g., "United States," "East Asia"); 618 socioeconomic indicators: represents socioeconomic background if applicable (e.g., "middle income," "working class"); 620 cultural attire: indicates if the individual is depicted wearing culturally specific attire (e.g., "traditional Indian clothing," "hijab"); and 622 other relevant attributes: any other attributes that are respectful, relevant to context, and necessary to align with policy requirements (e.g., "language spoken" and/or job role/occupation: if relevant, specifies the individual's profession or occupation e.g., "engineer," "teacher," "healthcare worker").

In at least one embodiment, the image metadata 602 can be implemented in a structured format. For example, a structured JSON format representing the information in the image metadata 602 can be used. For example, the image metadata 602, for each image of the images 122, can be structured as shown:

```
{
  "image_id": "img_001",
  "individuals": [
    {
      "id": "indv_001",
      "race": "Asian",
      "ethnicity": "Non-Hispanic",
      "gender": "Woman",
      "age_group": "Adult",
```

-continued

```
      "ability": "No Disability",
      "job_role": "Engineer",
      "geographic_origin": "East Asia",
      "socioeconomic_status": "Middle Income",
      "cultural_attire": "Business Professional",
      "other_attributes": {
        "language_spoken": "English"
      }
    },
    {
      "id": "indv_002",
      "race": "White",
      "ethnicity": "Non-Hispanic",
      "gender": "Man",
      "age_group": "Older Adult",
      "ability": "Mobility Disability",
      "job_role": "Retired",
      "geographic_origin": "North America",
      "socioeconomic_status": "Upper Income",
      "cultural_attire": "Casual Wear",
      "other_attributes": {
        "language_spoken": "English, Spanish"
      }
    }
  ]
}
```

Figure 7:
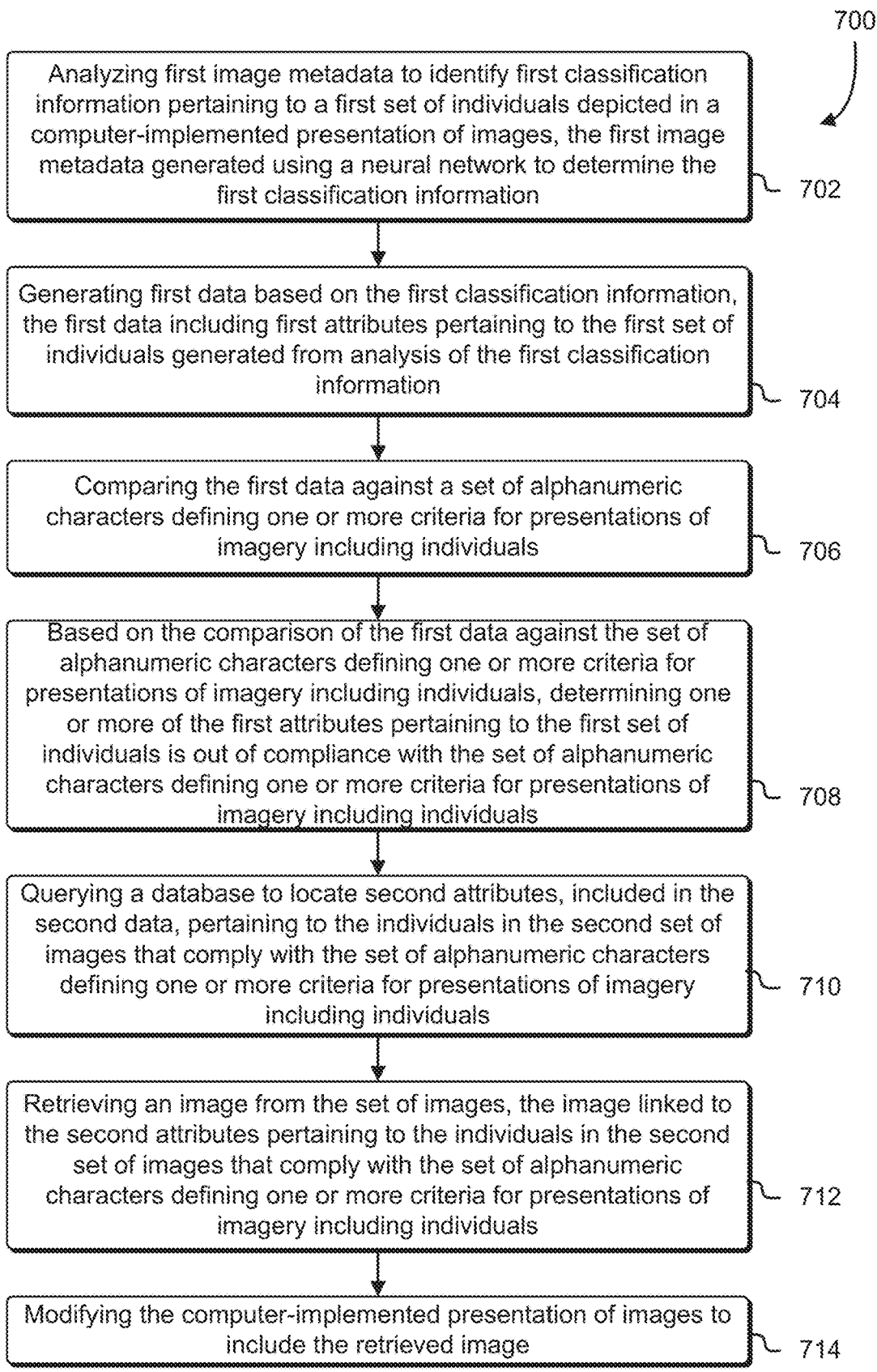
FIG. 7 is a flowchart illustrating an example of a process for evaluating and/or generating one or more computer-implemented presentations, in accordance with various embodiments.

FIG. 7 is a flowchart illustrating an example of a process 700 for evaluating and/or generating one or more computer-implemented presentations, in accordance with various embodiments. Some or all of the process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as the computing devices and/or systems of FIGS. 1-6 and FIG. 9. The process 700 includes a series of operations, identified by respective blocks in the following, to perform context-aware application provisioning for computing devices, in accordance with various embodiments.

In at least one embodiment, the process 700 can cause a system to analyze first image metadata to identify first classification information pertaining to a first set of individuals depicted in a computer-implemented presentation of images, wherein the first image metadata is generated using a neural network to determine the first classification information. The system can generate first data based on the first classification information, the first data including first attributes pertaining to the first set of individuals generated from the analysis of the first classification information. The system can compare the first data against a set of alphanumeric characters defining one or more criteria for presentations of imagery including individuals. Based on the comparison of the first data against the set of alphanumeric characters defining one or more criteria for presentations of imagery including individuals, the system can determine if one or more of the first attributes pertaining to the first set of individuals is out of compliance (e.g., does not conform) with the set of alphanumeric characters defining one or more criteria for presentations of imagery including individuals. The system can query a database including second image metadata linked to a set of images available to be included in the computer-implemented presentation of the images, wherein the set of images is collected based on metrics data generated from evaluating prior presentations including the images in the set of images. The second image metadata comprises second data for a second set of individuals depicted in the set of images, the second data generated from second classification information stored in digital files hosted on computer-implemented storage and provided by the second set of individuals depicted in the set of images. The querying can include locating second attributes, included in the second data, pertaining to the individuals in the second set of images that comply with the set of alphanumeric characters defining one or more criteria for presentations of imagery including individuals. The system can retrieve an image from the set of images, the image linked to the second attributes pertaining to the individuals in the second set of images that comply with the set of alphanumeric characters defining one or more criteria for presentations of imagery including individuals, and can modify the computer-implemented presentation of images to include the retrieved image.

More specifically, at block 702, first image metadata is analyzed to identify first classification information pertaining to a first set of individuals depicted in a computer-implemented presentation of images, the first image metadata generated using a neural network to determine the first classification information. In at least one embodiment, the first image metadata can be included in image metadata 125 and/or image metadata 602. The first image metadata can be associated with one or more of images 122. In at least one embodiment, the first image metadata is linked to one or more images included in the computer-implemented presentation of images. The computer-implemented presentation of images can be included in presentations 124. In at least one embodiment, the computer-implemented presentation of images comprises one or more of the presentations 102 and/or one or more of the presentations 124. The first classification information can include demographic information. This demographic information can include race, ethnicity, gender, ability, geographic origin, socioeconomic indicators, cultural attire, and/or other relevant attributes. In at least one embodiment, the neural network used to determine the first classification information is trained with a labeled dataset covering various demographic categories such as age, gender, ability, ethnicity, and so forth. In at least one embodiment, imagery management system 110 and/or presentation server 112 implement the neural network to determine the first classification information. In at least one embodiment, the first classification information can include one or more attributes, such as demographic attributes, associated with one or more images in the first set of individuals depicted in the computer-implemented presentation of images.

At block 704, first data is generated based on the first classification information, the first data including first attributes pertaining to the first set of individuals generated from analysis of the first classification information. In at least one embodiment, the first data is generated based on demographic attributes in the first classification information. These demographic attributes can include race information, ethnicity information, gender information, ability information, geographic origin information, socioeconomic indicator information, cultural attire information, and/or other relevant attributes associated with one or more individuals in the first set of individuals. In at least one embodiment, the first data can include aggregated demographic attributes determined from demographic information associated with a plurality of individuals represented in the first set of individuals. In at least one embodiment, the presentation server 112 and/or other systems of the imagery management system 110 perform generation of the first data. In at least one embodiment, described systems leverage image metadata 125 and/or image metadata 602 to determine the first classification information.

At block 706, the first data is compared against a set of alphanumeric characters defining one or more criteria for presentations of imagery including individuals. In at least one embodiment, the set of alphanumeric characters defining one or more criteria for presentations of imagery including individuals is included in a policy. The at least one embodiment, the policy is the policy 118 and/or the policy 502. In at least one embodiment, the comparison is performed by the presentation server 112 and/or one or more systems of the imagery management system 110. The policy may include thresholds related to gender, race, ability, and/or age for individuals depicted in the imagery. The set of alphanumeric characters defining one or more criteria for presentations of imagery including individuals outlines guidelines and standards for how individuals and groups are depicted in marketing materials. A goal of the set of alphanumeric characters defining one or more criteria for presentations of imagery including individuals is to ensure that representations in advertisement frameworks and/or customer journey frameworks are diverse, inclusive, and respectful. For example, the set of alphanumeric characters defining one or more criteria for presentations of imagery including individuals can be used to ensure that the frameworks reflect a wide range of identities, including different races, genders, ages, abilities, sexual orientations, and cultural backgrounds. Additionally, the set of alphanumeric characters defining one or more criteria for presentations of imagery including individuals can be put in place to ensure inclusivity by considering how various audiences may engage with advertisements, including those with disabilities. In some examples, the set of alphanumeric characters defining one or more criteria for presentations of imagery including individuals can be used to establish a process for reviewing the frameworks to ensure they meet representation standards, and create mechanisms for accountability and feedback. Presentations can be evaluated against the set of alphanumeric characters defining one or more criteria for presentations of imagery including individuals to determine the presentations comply with the representation criteria outlined in the set of alphanumeric characters defining one or more criteria for presentations of imagery including individuals. These criteria can be specifically tailored to assess representation in imagery of the presentation. Consequently, the set of alphanumeric characters defining one or more criteria for presentations of imagery including individuals can include demographic categories for analysis, such as race, gender, age, ability, sexual orientation, and cultural background. In some instances, one or more criteria may encompass relevant subcategories within each demographic category to enhance specificity, such as ethnic groups and gender identities. Additionally, the set of alphanumeric characters defining one or more criteria for presentations of imagery including individuals can include metrics for assessing representation, such as the percentages of individuals from various demographic groups. The set of alphanumeric characters defining one or more criteria for presentations of imagery including individuals may also establish one or more thresholds for demographic representation to ensure a minimum level of diversity is achieved in a presentation depicting individuals.

At block 708, based on the comparison of the first data against the set of alphanumeric characters defining one or more criteria for presentations of imagery including individuals, one or more of the first attributes pertaining to the first set of individuals is determined to be out of compliance (e.g., does not conform) with the set of alphanumeric characters defining one or more criteria for presentations of imagery including individuals. In at least one embodiment, the first data is generated based on demographic attributes in the first classification information. These demographic attributes can include race information, ethnicity information, gender information, ability information, geographic origin information, socioeconomic indicator information, cultural attire information, and/or other relevant attributes associated with one or more individuals in the first set of individuals. In at least one embodiment, the first data can include aggregated demographic attributes determined from demographic information associated with a plurality of individuals represented in the first set of individuals. In at least one embodiment, the presentation server 112 and/or other systems of the imagery management system 110 perform generation of the first data.

At block 710, a database including second image metadata linked to a set of images available to be included in the computer-implemented presentation of the images is queried, the set of images collected based on metrics data generated from evaluating prior presentations including the images in the set of images, the second image metadata comprising second data for a second set of individuals depicted in the set of images, the second data generated from second classification information stored in digital files hosted on computer-implemented storage and provided by the second set of individuals depicted in the set of images, the querying including locating second attributes, included in the second data, pertaining to the individuals in the second set of images that comply with the set of alphanumeric characters defining one or more criteria for presentations of imagery including individuals. In at least one embodiment, the second data is generated based on demographic attributes in the second classification information. These demographic attributes can include race information, ethnicity information, gender information, ability information, geographic origin information, socioeconomic indicator information, cultural attire information, and/or other relevant attributes associated with one or more individuals in the second set of individuals. In at least one embodiment, the second data can include aggregated demographic attributes determined from demographic information associated with a plurality of individuals represented in the second set of individuals. In at least one embodiment, the presentation server 112 and/or other systems of the imagery management system 110 perform generation of the second data. In at least one embodiment, described systems leverage image metadata 125 and/or image metadata 602 to determine the second classification information. In at least one embodiment, the set of images available to be included in the computer-implemented presentation of the images is obtained from the images 122 and/or included in the images 122.

At block 712, an image from the set of images is retrieved, the image linked to the second attributes pertaining to the individuals in the second set of images that comply with the set of alphanumeric characters defining one or more criteria for presentations of imagery including individuals. In at least one embodiment, the image is retrieved from the images 122 or other images associated with the system environment 100.

At block 714, the computer-implemented presentation of images is modified to include the retrieved image. The at least one embodiment, the computer-implemented presentation that undergoes a modification include the presentation 102. In at least one embodiment, the computer-implemented presentation that undergoes modification include one or more of the presentations 124.

Figure 8:
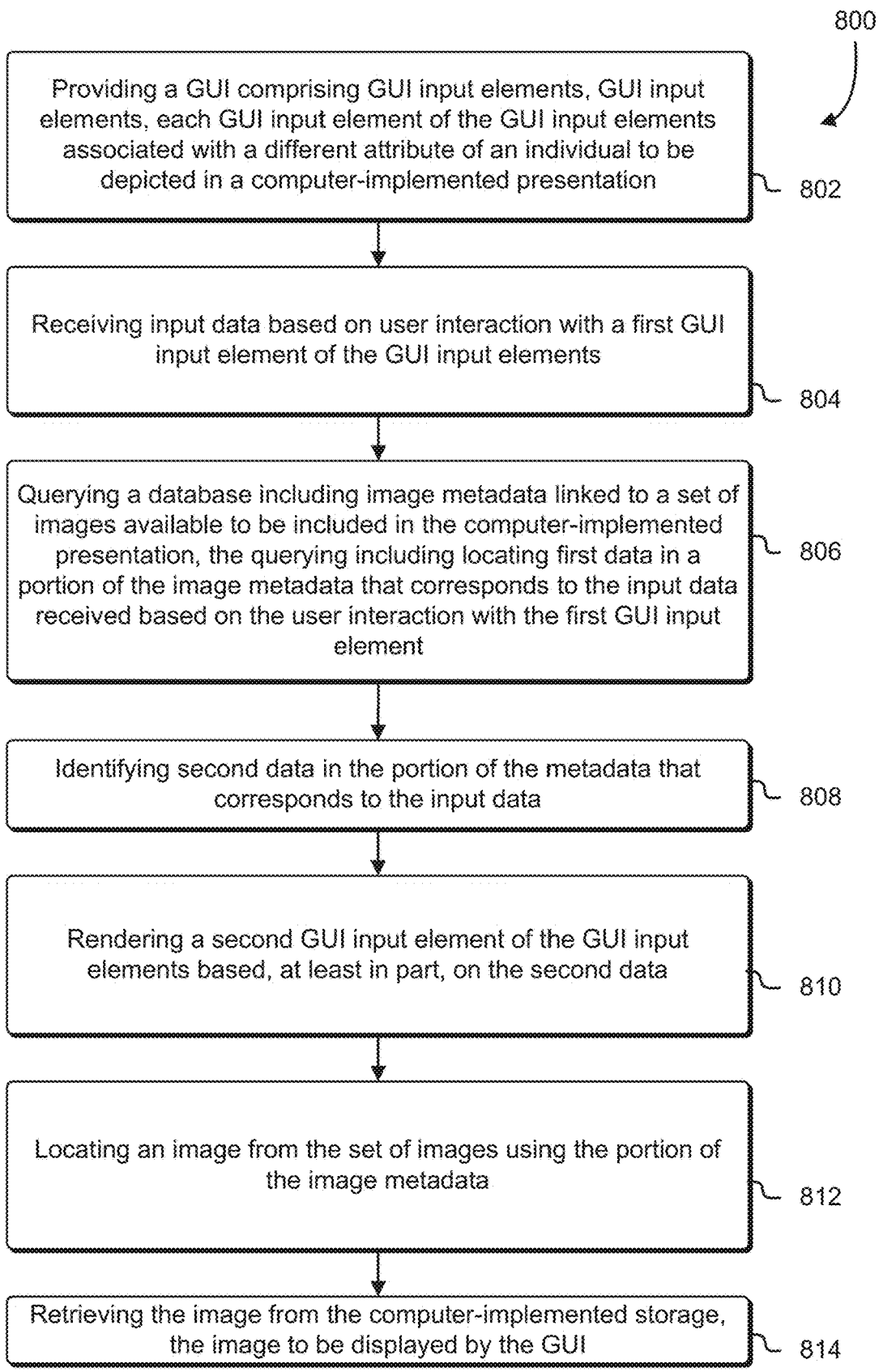
FIG. 8 is a flowchart illustrating an example of a process for evaluating and/or generating one or more computer-implemented presentations, in accordance with various embodiments.

FIG. 8 is a flowchart illustrating an example of a process 800 for evaluating and/or generating one or more computer-implemented presentations, in accordance with various embodiments. Some or all of the process 800 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as the computing devices and/or systems of FIGS. 1-6 and FIG. 9. The process 800 includes a series of operations, identified by respective blocks in the following, to perform context-aware application provisioning for computing devices, in accordance with various embodiments.

The process 800 can include causing the system to provide a graphical user interface (GUI) comprising GUI input elements, each GUI input element usable to define a different attribute of an individual to be depicted in a computer-implemented presentation. The system can retrieve an attribute based on user interaction with a first GUI input element and, based on the attribute, query a database including image metadata linked to a set of images available to be included in the computer-implemented presentation. The set of images can be collected based on metrics data generated from evaluating prior presentations, and the image metadata comprises data for a set of individuals depicted in the set of images. This data can be generated from classification information stored in digital files hosted on computer-implemented storage and provided by the set of individuals depicted in the set of images. The querying can include locating first data in a portion of the image metadata that corresponds to the attribute received based on the user interaction with the first GUI input element. The system can identify second data in the portion of the metadata that corresponds to the attribute, render a second GUI input element based, at least in part, on the second data, locate an image from the set of images using the portion of the image metadata, and can retrieve the image from the computer-implemented storage to be displayed by the GUI.

At block 802, a GUI including GUI input elements is provided, GUI input elements, each GUI input element of the GUI input elements associated with a different attribute of an individual to be depicted in a computer-implemented presentation. In at least one embodiment, one or more of the GUI input elements can be populated with a percentage value related to a different attribute of an individual to be depicted in a computer-implemented presentation. In at least one embodiment, the different attribute can be associated with demographics information. This demographic information can include race, ethnicity, gender, ability, geographic origin, socioeconomic indicators, cultural attire, and/or other relevant attributes. In at least one embodiment, the GUI including the GUI input elements is associated with the presentation GUI 106. In at least one embodiment, the computer-implemented presentation corresponds to the presentation 102 and/or one or more the presentations 124 hosted by the imagery management system 110.

At block 804, input data is received based on user interaction with a first GUI input element of the GUI input elements. In at least one embodiment, the input data is in the form of a percentage value. The input data can be received by one or more of the GUI input elements 302, 304, and 306. In at least one embodiment, the input data is received and processed by one or more system elements of the imagery management system 110. In at least one embodiment, the input data can be received and processed by the presentation server 112.

At block 806, based on the input data, a database is queried that includes image metadata linked to a set of images available to be included in the computer-implemented presentation, the set of images collected based on metrics data generated from evaluating prior presentations including the images in the set of images, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element. In at least one embodiment, the database hosts the image metadata 125. In at least one embodiment, the database is implemented by one or more systems of the imagery management system 110. The set of images available to be included in the computer-implemented presentation can be associated with the images 122 and hosted by the computer storage system 120. The metrics data can be derived from evaluating how the presentations/frameworks were utilized. For instance, the metrics data may be generated from positive feedback provided by the audience of the presentations/frameworks. For instance, the metrics data may be generated from positive feedback provided by the audience of the presentations 124 previously disseminated. In various embodiments, metrics data collected to analyze the success or failure of the presentations 124 across online, TV, and print media include reach and impression data, engagement and interaction metrics, conversion and sales impact indicators, brand awareness and sentiment metrics, cost and efficiency metrics, and frequency-related data. Reach and impression metrics track the total exposure to unique viewers, while engagement metrics capture user interactions, such as click-through rates, social media shares, and viewer response. Conversion data includes conversion rates and sales impact to measure the effectiveness of driving desired actions, while brand-related metrics, such as brand lift surveys and sentiment analysis, assess audience perception and recall. Cost efficiency is determined through metrics like CPM and ROAS, which measure advertising spend relative to impact. Additionally, frequency data measures exposure rates to prevent viewer fatigue and maximize retention, informing optimal ad placement and timing across media channels. In at least one embodiment, the first data can correspond to demographics information included in image metadata. In at least one embodiment, the classification information it can include one or more demographic attributes. These demographic attributes can include race information, ethnicity information, gender information, ability information, geographic origin information, socioeconomic indicator information, cultural attire information, and/or other relevant attributes associated with one or more individuals depicted in imagery.

At block 808, second data in the portion of the metadata is identified that corresponds to the input data. In at least one embodiment, the input data is associated with demographic information and/or a demographic attribute and the second data corresponds to the demographic information and/or the demographic attribute associated with the input data. When the second data can be associated with demographic data or information comprising race, ethnicity, gender, ability, geographic origin, socioeconomic indicators, cultural attire, and/or other relevant attributes.

At block 810, a second GUI input element of the GUI input elements based is rendered, at least in part, on the second data. In at least one embodiment, rendering the second GUI input element includes adjusting a value associated with the second GUI input element. In at least one embodiment, the value is a percentage value linked to demographic data or information comprising race, ethnicity, gender, ability, geographic origin, socioeconomic indicators, cultural attire, and/or other relevant attributes. In some examples, rendering the second GUI input element is triggered based on a modification to a value associated with the first GUI input element.

At block 812, an image from the set of images is located using the portion of the image metadata. In at least one embodiment, the image is located from the images 122 hosted by the computer storage system 120. The portion of the image metadata can correspond to demographic data or information comprising race, ethnicity, gender, ability, geographic origin, socioeconomic indicators, cultural attire, and/or other relevant attributes.

At 814, the image is retrieved from the computer-implemented storage, the image to be displayed by the GUI. In at least one embodiment, the image is retrieved from the image 122 hosted by the computer storage system 120. At least one embodiment, the retrieved image is to be displayed or incorporated into one or more of the presentations 108, 208, and presentations 124.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 9:
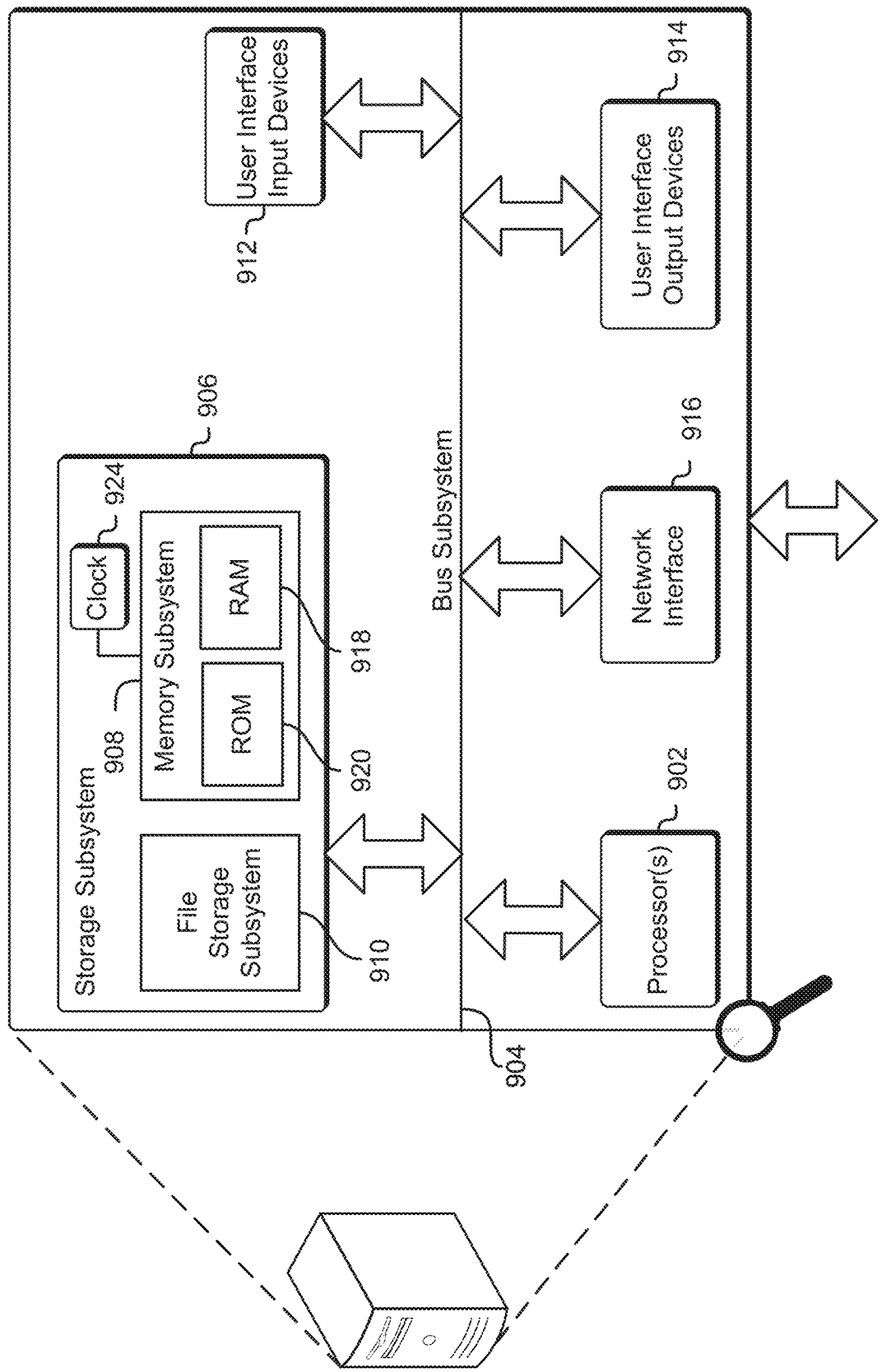
FIG. 9 illustrates a computing device that may be used in accordance with at least one embodiment and/or at least one environment in which various described one or more embodiments can be implemented.

FIG. 9 is an illustrative, simplified block diagram of a computing device 900 that can be used to practice at least one embodiment of the present disclosure. In various embodiments, the computing device 900 includes any appropriate device operable to send and/or receive requests, messages, or information over an appropriate network and convey information back to a user of the device. The computing device 900 may be used to implement any of the systems illustrated and described above. For example, the computing device 900 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 900 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 9, the computing device 900 may include one or more processors 902 that, in embodiments, communicate with and are operatively coupled to a number of peripheral subsystems via a bus subsystem. In some embodiments, these peripheral subsystems include a storage subsystem 906, comprising a memory subsystem 908 and a file/disk storage subsystem 910, one or more user interface input devices 912, one or more user interface output devices 914, and a network interface subsystem 916. Such storage subsystem 906 may be used for temporary or long-term storage of information.

In some embodiments, the bus subsystem 904 may provide a mechanism for enabling the various components and subsystems of computing device 900 to communicate with each other as intended. Although the bus subsystem 904 is shown schematically as a single bus, alternative embodiments of the bus subsystem utilize multiple buses. The network interface subsystem 916 may provide an interface to other computing devices and networks. The network interface subsystem 916 may serve as an interface for receiving data from and transmitting data to other systems from the computing device 900. In some embodiments, the bus subsystem 904 is utilized for communicating data such as details, search terms, and so on. In an embodiment, the network interface subsystem 916 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 916 is enabled by wired and/or wireless connections and combinations thereof.

In some embodiments, the user interface input devices 912 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 900. In some embodiments, the one or more user interface output devices 914 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 900. The one or more user interface output devices 914 can be used, for example, to present user interfaces to facilitate user interaction with applications performing processes described and variations therein, when such interaction may be appropriate.

In some embodiments, the storage subsystem 906 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 906. These application modules or instructions can be executed by the one or more processors 902. In various embodiments, the storage subsystem 906 additionally provides a repository for storing data used in accordance with the present disclosure. In some embodiments, the storage subsystem 906 comprises a memory subsystem 908 and a file/disk storage subsystem 910.

In embodiments, the memory subsystem 908 includes a number of memories, such as a main random access memory (RAM) 918 for storage of instructions and data during program execution and/or a read only memory (ROM) 920, in which fixed instructions can be stored. In some embodiments, the file/disk storage subsystem 910 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 900 includes at least one local clock 924. The at least one local clock 924, in some embodiments, is a counter that represents the number of ticks that have transpired from a particular starting date and, in some embodiments, is located integrally within the computing device 900. In various embodiments, the at least one local clock 924 is used to synchronize data transfers in the processors for the computing device 900 and the subsystems included therein at specific clock pulses and can be used to coordinate synchronous operations between the computing device 900 and other systems in a data center. In another embodiment, the local clock is a programmable interval timer.

The computing device 900 could be of any of a variety of types, including a portable computer device, tablet computer, a workstation, or any other device described below. Additionally, the computing device 900 can include another device that, in some embodiments, can be connected to the computing device 900 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 900 for processing. Due to the ever-changing nature of computers and networks, the description of the computing device 900 depicted in FIG. 9 is intended only as a specific example for purposes of illustrating the preferred embodiment of the device. Many other configurations having more or fewer components than the system depicted in FIG. 9 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 900 may include any appropriate hardware, software and firmware for integrating with a data store as needed to execute aspects of one or more applications for the computing device 900 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 900 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 900 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 900 may provide the content in one or more forms including, but not limited to, forms that are perceptible to the user audibly, visually, and/or through other senses. The handling of requests and responses, as well as the delivery of content, in an embodiment, is handled by the computing device 900 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 900 typically will include an operating system that provides executable program instructions for the general administration and operation of the computing device 900 and includes a computer-readable storage medium (e.g., a hard disk, random access memory (RAM), read only memory (ROM), etc.) storing instructions that if executed (e.g., as a result of being executed) by a processor of the computing device 900 cause or otherwise allow the computing device 900 to perform its intended functions (e.g., the functions are performed as a result of one or more processors of the computing device 900 executing instructions stored on a computer-readable storage medium).

In an embodiment, the computing device 900 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 900 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 900 is capable of storing, retrieving, and accessing structured or unstructured data. In an embodiment, computing device 900 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

Clause 1. A system, comprising: one or more processors; and memory that stores computer-executable instructions that, as a result of execution by the one or more processors, cause the system to at least: analyze first image metadata to extract first classification information pertaining to a first set of individuals depicted in a presentation of images, the first image metadata generated using a neural network to classify characteristics of the first set of individuals; generate first data based on the first classification information, the first data including first attributes derived from the classification information associated with the first set of individuals; compare the first data against a set of alphanumeric characters defining one or more criteria for presentations of imagery including individuals; based on the comparison of the first data against the set of alphanumeric characters defining one or more criteria for presentations of imagery including individuals, determine one or more of the first attributes pertaining to the first set of individuals deviate from the set of alphanumeric characters defining one or more criteria for presentations of imagery including individuals; query a database including second image metadata linked to a set of images available for inclusion in the presentation of the images, the set of images selected based on metrics data generated from prior evaluations of image usage, the second image metadata comprising second data for a second set of individuals depicted in the set of images, the second data generated from second classification information stored in digital files and provided by the second set of individuals depicted in the set of images, the query identifying second attributes included in the second data that confirm to set of alphanumeric characters defining one or more criteria for presentations of imagery including individuals; retrieve an image from the set of images, the image associated with the second attributes pertaining to the individuals in the second set of images confirming to the set of alphanumeric characters defining one or more criteria for presentations of imagery including individuals; and adjust the presentation of images to include the retrieved image.

Clause 2. The system of any of the preceding clauses, wherein the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising one or more of gender data, race data, ability data, or age data for individuals depicted in presentations of imagery including individuals.

Clause 3. The system of any of the preceding clauses, wherein the second classification information stored in digital files and provided by the second set of individuals comprises one or more of gender data, race data, ability data, or age data information.

Clause 4. The system of any of the preceding clauses, wherein the presentation of images is comprised in one or more advertisements to be presented via social media, online advertising, television, or print media, and modifying the presentation of images to include the retrieved image comprises modifying the one or more advertisements to include the retrieved image.

Clause 5. A computer-implemented method, comprising: generating first data based on first classification information for a first set of individuals depicted in a presentation of images, the first data comprising one or more first attributes of the first set of individuals depicted in the presentation of images; comparing the first data against one or more criteria for presentations of imagery including individuals; determining a compliance condition based on a result of comparing the first data against the one or more criteria for presentations of imagery including individuals; based at least in part on the compliance condition, querying image metadata linked to a set of images available for inclusion in the presentation of images, the image metadata comprising second data for a second set of individuals depicted in the set of images, the second data generated from second classification information at least in part provided by the second set of individuals depicted in the set of images, querying the image metadata to identify one or more second attributes included in the second data that conform to the one or more criteria for presentations of imagery including individuals; and selecting one or more images in the second set of images to be associated with the presentation of images, the selected one or more images associated with the one or more second attributes.

Clause 6. The computer-implemented method of any of the preceding clauses, wherein the first and second classification information comprises attribute information determined by a machine learning (ML) model trained to determine the attribute information associated with the imagery including individuals.

Clause 7. The computer-implemented method of any of the preceding clauses, wherein the one or more first attributes comprise first classification data comprising one or more of an age data, gender data, or ethnicity data of the first set of individuals depicted in the presentation of images.

Clause 8. The computer-implemented method of any of the preceding clauses, wherein the one or more criteria comprises data structured in JavaScript Object Notation (JSON) format.

Clause 9. The computer-implemented method of any of the preceding clauses, wherein the second classification information comprises information provided by the second set of individuals.

Clause 10. The computer-implemented method of any of the preceding clauses, wherein the image metadata comprises structured data at least for individuals depicted in imagery.

Clause 11. The computer-implemented method of any of the preceding clauses, wherein the set of images includes one or more images collected based on metrics data generated based on prior evaluations of one or more images of the set of images.

Clause 12. The computer-implemented method of any of the preceding clauses, wherein the metrics data comprises data generated based on feedback information determined from dissemination of the prior presentations including the set of images via one or more media accessible to end-users.

Clause 13. A non-transitory computer-readable storage medium having stored thereon executable instructions that, if executed by one or more processors of a computer system, cause the computer system to at least: generate first data based on first classification information for a first set of individuals depicted in a presentation of images, the first data comprising one or more first attributes of the first set of individuals depicted in the presentation of images; compare the first data against one or more criteria for presentations of imagery including individuals; determine a compliance condition based on a result of comparing the first data against the one or more criteria for presentations of imagery including individuals; based at least in part on the compliance condition, query image metadata linked to a set of images available to be included in the presentation of images, the image metadata comprising second data for a second set of individuals depicted in the set of images, the second data generated from second classification information at least in part provided by the second set of individuals depicted in the set of images, querying the image metadata to identify one or more second attributes included in the second data that conform to the one or more criteria for presentations of imagery including individuals; and select one or more images in the second set of images to be associated with the presentation of images, the selected one or more images associated with the one or more second attributes.

Clause 14. The non-transitory computer-readable storage medium of any of the preceding clauses, wherein the first and second classification information comprises attribute information determined by a machine learning (ML) model trained to determine the attribute information associated with the imagery including individuals.

Clause 15. The non-transitory computer-readable storage medium of any of the preceding clauses, wherein the one or more first attributes comprise first classification data comprising one or more of an age data, gender data, or ethnicity data of the first set of individuals depicted in the presentation of images.

Clause 16. The non-transitory computer-readable storage medium of any of the preceding clauses, wherein the one or more criteria comprises data structured in JavaScript Object Notation (JSON) format.

Clause 17. The non-transitory computer-readable storage medium of any of the preceding clauses, wherein the second classification information comprises attribute data for the second set of individuals.

Clause 18. The non-transitory computer-readable storage medium of any of the preceding clauses, wherein the presentation of images is comprised in one or more digital or print media.

Clause 19. The non-transitory computer-readable storage medium of any of the preceding clauses, wherein the set of images includes one or more images collected based on metrics data.

Clause 20. The non-transitory computer-readable storage medium of any of the preceding clauses, wherein the metrics data comprises data based on information determined from use of the presentations including the set of images.

At least one embodiment of the disclosure can be described in view of the following additional clauses:

Clause 1. A system, comprising: one or more processors; and memory that stores computer-executable instructions that, as a result of execution by the one or more processors, cause the system to at least: provide a graphical user interface (GUI) comprising GUI input elements, each GUI input element of the GUI input elements associated with a different attribute of an individual to be depicted in a presentation; receive input data based on user interaction with a first GUI input element of the GUI input elements; based on the input data, query image metadata for a set of images for inclusion in the presentation, the set of images collected based on metrics data generated from evaluation of image usage, the image metadata comprising data for a set of individuals depicted in the set of images, the data generated from classification information stored in files in computer storage and provided by the set of individuals depicted in the set of images, the query identifying first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer storage, the image to be displayed by the GUI.

Clause 2. The system of any of the preceding clauses, wherein the first GUI input element is associated with an ability attribute and the second GUI input element of the GUI input elements is associated with an age attribute.

Clause 3. The system of any of the preceding clauses, wherein rendering the second GUI input element based, at least in part, on the second data comprises rendering the second GUI input element based on another attribute comprised in the second data.

Clause 4. The system of any of the preceding clauses, wherein the classification information comprises one or more of gender data, ability data, or age data.

Clause 5. The system of any of the preceding clauses, wherein the memory that stores the computer-executable instructions that, as a result of execution by the one or more processors, further cause the system to at least render each GUI input element of the GUI input elements based on a plurality of individuals depicted in the presentation.

Clause 6. The system of any of the preceding clauses, wherein the metrics data comprises data associated with the prior presentations including the set of images.

Clause 7. The system of any of the preceding clauses, wherein the presentation of images is comprised in one or more media.

Clause 8. The system of any of the preceding clauses, wherein the input data comprises a percentage value, and rendering the second GUI input element of the GUI input elements includes generating a second input value comprising another percentage value.

Clause 9. A computer-implemented method, comprising: providing a graphical user interface (GUI) comprising GUI input elements, each GUI input element of the GUI input elements associated with a different attribute of an individual to be depicted in a presentation; receiving input data based on user interaction with a first GUI input element of the GUI input elements; based on the input data, searching image metadata for a set of images for inclusion in the presentation, the image metadata comprising data for a set of individuals depicted in the set of images, the data generated from classification information stored on computer storage and provided by the set of individuals depicted in the set of images, the search identifying first data in a portion of the image metadata that corresponds to the input data received based on the user interaction with the first GUI input element; identifying second data in the portion of the metadata that corresponds to the input data; rendering a second GUI input element of the GUI input elements based, at least in part, on the second data; locating an image from the set of images using the portion of the image metadata; and retrieving the image from the computer storage, the image to be displayed by the GUI.

Clause 10. The computer-implemented method of any of the preceding clauses, further comprising adjusting the presentation to include the image retrieved from the computer storage.

Clause 11. The computer-implemented method of any of the preceding clauses, wherein the set of images includes one or more images collected based on metrics data.

Clause 12. The computer-implemented method of any of the preceding clauses, wherein the metrics data comprises data generated from presentations including the set of images.

Clause 13. The computer-implemented method of any of the preceding clauses, wherein the input data comprises a percentage value, and rendering the second GUI input element of the GUI input elements includes generating a second input value comprising another percentage value.

Clause 14. The computer-implemented method of any of the preceding clauses, wherein one or more of the GUI input elements is an adjustable GUI input element, the adjustable GUI input element to adjust one or more attribute associated with one or more individuals depicted in the presentation.

Clause 15. A non-transitory computer-readable storage medium having stored thereon executable instructions that, if executed by one or more processors of a computer system, cause the computer system to at least: provide a graphical user interface (GUI) comprising GUI input elements, each GUI input element of the GUI input elements associated with a different attribute of an individual to be depicted in a presentation; receive input data based on user interaction with a first GUI input element of the GUI input elements; based on the input data, search image metadata for a set of images for inclusion in the presentation, the image metadata comprising data for a set of individuals depicted in the set of images, the data generated from classification information stored in files stored in computer storage and provided by the set of individuals depicted in the set of images, the search identifying first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer storage, the image to be displayed by the GUI.

Clause 16. The non-transitory computer-readable storage medium of any of the preceding clauses, wherein the presentation is comprised in one or more media.

Clause 17. The non-transitory computer-readable storage medium of any of the preceding clauses, wherein the executable instructions that, if executed by one or more processors of a computer system, cause the computer system to at least update the presentation to include the image retrieved from the computer storage.

Clause 18. The non-transitory computer-readable storage medium of any of the preceding clauses, wherein the set of images includes one or more images collected based on metrics data.

Clause 19. The non-transitory computer-readable storage medium of any of the preceding clauses, wherein the metrics data comprises data associated with presentations including the set of images.

Clause 20. The non-transitory computer-readable storage medium of any of the preceding clauses, wherein one or more of the GUI input elements is an adjustable GUI element, the adjustable GUI element to adjust one or more attributes associated with one or more individuals depicted in the presentation.

At least one embodiment of the disclosure can be described in view of the following additional clauses:

Clause 1. A system, comprising: one or more processors; and memory that stores computer-executable instructions that, as a result of execution by the one or more processors, cause the system to at least: analyze first image metadata to identify first classification information pertaining to a first set of individuals depicted in a computer-implemented presentation of images, the first image metadata generated using a neural network to determine the first classification information; generate first data based on the first classification information, the first data including first attributes pertaining to the first set of individuals generated from analysis of the first classification information; compare the first data against a set of alphanumeric characters defining one or more criteria for presentations of imagery including individuals; based on the comparison of the first data against the set of alphanumeric characters defining one or more criteria for presentations of imagery including individuals, determine one or more of the first attributes pertaining to the first set of individuals is out of compliance with the set of alphanumeric characters defining one or more criteria for presentations of imagery including individuals; query a database including second image metadata linked to a set of images available to be included in the computer-implemented presentation of the images, the set of images collected based on metrics data generated from evaluating prior presentations including the images in the set of images, the second image metadata comprising second data for a second set of individuals depicted in the set of images, the second data generated from second classification information stored in digital files hosted on computer-implemented storage and provided by the second set of individuals depicted in the set of images, the querying including locating second attributes, included in the second data, pertaining to the individuals in the second set of images that comply with the set of alphanumeric characters defining one or more criteria for presentations of imagery including individuals; retrieve an image from the set of images, the image linked to the second attributes pertaining to the individuals in the second set of images that comply with the set of alphanumeric characters defining one or more criteria for presentations of imagery including individuals; and modify the computer-implemented presentation of images to include the retrieved image.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Clause 2. The system of any of the preceding clauses, wherein the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising threshold information pertaining to one or more of gender, race, ability, or age of individuals depicted in presentations of imagery including individuals.

Clause 3. The system of any of the preceding clauses, wherein the second classification information stored in digital files and provided by the second set of individuals comprises demographics information provided by the second set of individuals, the demographics information provided by the second set of individuals comprising one or more of gender, race, ability, or age information.

Clause 4. The system of any of the preceding clauses, wherein the computer-implemented presentation of images is comprised in one or more advertisements to be presented via social media, online advertising, television, or print media, and modifying the computer-implemented presentation of images to include the retrieved image comprises modifying the one or more advertisements to include the retrieved image.

Clause 5. A computer-implemented method, comprising: generating first data based on first classification information pertaining to a first set of individuals depicted in a computer-implemented presentation of images, the first data comprising one or more first attributes pertaining to the first set of individuals depicted in the computer-implemented presentation of images; comparing the first data against one or more criteria for presentations of imagery including individuals; determining a compliance condition based on a result of comparing the first data against the one or more criteria for presentations of imagery including individuals; based at least in part on the compliance condition, querying second image metadata linked to a set of images available to be included in the computer-implemented presentation of images, the second image metadata comprising second data for a second set of individuals depicted in the set of images, the second data generated from second classification information stored in computer-implemented storage and at least in part provided by the second set of individuals depicted in the set of images, the querying including locating one or more second attributes, in the second data, pertaining to the individuals in the second set of images that conform to the one or more criteria for presentations of imagery including individuals; and selecting one or more images in the second set of images to be associated with the computer-implemented presentation of images, the selected one or more images associated with the one or more second attributes pertaining to the individuals in the second set of images that conform to the one or more criteria for presentations of imagery including individuals.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Clause 6. The computer-implemented method of any of the preceding clauses, wherein the first and second classification information comprises demographic information determined by a machine learning (ML) model trained to determine the demographic information associated with the imagery including individuals.

Clause 7. The computer-implemented method of any of the preceding clauses, wherein the one or more first attributes comprise first demographic information comprising one or more of an age information, gender information, or ethnicity information pertaining to the first set of individuals depicted in the computer-implemented presentation of images.

Clause 8. The computer-implemented method of any of the preceding clauses, wherein the one or more criteria for presentations of the imagery including individuals comprises one or more threshold values including an age threshold value, a gender threshold value, or an ethnicity threshold value.

Clause 9. The computer-implemented method of any of the preceding clauses, wherein the second classification information comprises demographics information provided by the second set of individuals, the demographics information provided by the second set of individuals comprising one or more of gender, race, ability, or age information.

Clause 10. The computer-implemented method of any of the preceding clauses, wherein the computer-implemented presentation of images is comprised in one or more advertisements to be presented via social media, online advertising, television, or print media, the method further comprising modifying the computer-implemented presentation of images to include the selected one or more images based on the compliance condition, the compliance condition indicating the one or more first attributes do not comply with the one or more criteria for presentations of imagery including individuals.

Clause 11. The computer-implemented method of any of the preceding clauses, wherein the set of images includes one or more images collected based on metrics data generated from evaluating prior presentations including the set of images.

Clause 12. The computer-implemented method of any of the preceding clauses, wherein the metrics data comprises data generated based on feedback information determined from dissemination of the prior presentations including the set of images via one or more media accessible to end-users.

Clause 13. A non-transitory computer-readable storage medium having stored thereon executable instructions that, if executed by one or more processors of a computer system, cause the computer system to at least: generate first data based on first classification information pertaining to a first set of individuals depicted in a computer-implemented presentation of images, the first data comprising one or more first attributes pertaining to the first set of individuals depicted in the computer-implemented presentation of images; compare the first data against one or more criteria for presentations of imagery including individuals; determine a compliance condition based on a result of comparing the first data against the one or more criteria for presentations of imagery including individuals; based at least in part on the compliance condition, query second image metadata linked to a set of images available to be included in the computer-implemented presentation of images, the second image metadata comprising second data for a second set of individuals depicted in the set of images, the second data generated from second classification information stored in computer-implemented storage and at least in part provided by the second set of individuals depicted in the set of images, the querying including locating one or more second attributes, in the second data, pertaining to the individuals in the second set of images that conform to the one or more criteria for presentations of imagery including individuals; and select one or more images in the second set of images to be associated with the computer-implemented presentation of images, the selected one or more images associated with the one or more second attributes pertaining to the individuals in the second set of images that conform to the one or more criteria for presentations of imagery including individuals.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Clause 14. The non-transitory computer-readable storage medium of any of the preceding clauses, wherein the first and second classification information comprises demographic information determined by a machine learning (ML) model trained to determine the demographic information associated with the imagery including individuals.

Clause 15. The non-transitory computer-readable storage medium of any of the preceding clauses, wherein the one or more first attributes comprise first demographic information comprising one or more of an age information, gender information, and ethnicity information pertaining to the first set of individuals depicted in the computer-implemented presentation of images.

Clause 16. The non-transitory computer-readable storage medium of any of the preceding clauses, wherein the one or more criteria for presentations of the imagery including individuals comprises one or more threshold values including an age threshold value, a gender threshold value, or an ethnicity threshold value.

Clause 17. The non-transitory computer-readable storage medium of any of the preceding clauses, wherein the second classification information comprises demographics information provided by the second set of individuals, the demographics information provided by the second set of individuals comprising one or more of gender, race, ability, and age information.

Clause 18. The non-transitory computer-readable storage medium of any of the preceding clauses, wherein the computer-implemented presentation of images is comprised in one or more advertisements to be presented via social media, online advertising, television, or print media, the method further comprising modifying the computer-implemented presentation of images to include the selected one or more images.

Clause 19. The non-transitory computer-readable storage medium of any of the preceding clauses, wherein the set of images includes one or more images collected based on metrics data generated from evaluating prior presentations including the set of images.

Clause 20. The non-transitory computer-readable storage medium of any of the preceding clauses, wherein the metrics data comprises data generated based on feedback information determined from dissemination of the prior presentations including the set of images via one or more media accessible to end-users.

At least one embodiment of the disclosure can be described in view of the following additional clauses:

Clause 1. A system, comprising: one or more processors; and memory that stores computer-executable instructions that, as a result of execution by the one or more processors, cause the system to at least: provide a graphical user interface (GUI) comprising GUI input elements, each GUI input element of the GUI input elements associated with a different attribute of an individual to be depicted in a computer-implemented presentation; receive input data based on user interaction with a first GUI input element of the GUI input elements; based on the input data, query a database including image metadata linked to a set of images available to be included in the computer-implemented presentation, the set of images collected based on metrics data generated from evaluating prior presentations including the images in the set of images, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer-implemented storage, the image to be displayed by the GUI.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Clause 2. The system of any of the preceding clauses, wherein the first GUI input element is associated with gender and the second GUI input element of the GUI input elements is associated with age.

Clause 3. The system of any of the preceding clauses, wherein rendering the second GUI input element based, at least in part, on the second data comprises rendering the second GUI input element based on another attribute comprised in the second data, and the attribute is associated with first demographic information and the other attribute is associated with a second demographic information different than the first demographic information.

Clause 4. The system of any of the preceding clauses, wherein the classification information stored in digital files and provided by the set of individuals comprises demographics information provided by the set of individuals, the demographics information provided by the set of individuals comprising one or more of gender, race, ability, or age information.

Clause 5. The system of any of the preceding clauses, wherein the memory that stores the computer-executable instructions that, as a result of execution by the one or more processors, further cause the system to at least: render each GUI input element of the GUI input elements based on a plurality of individuals depicted in the computer-implemented presentation; update the computer-implemented presentation to include the image retrieved from the computer-implemented storage; and update the rendering of one or more of the GUI input elements based, at least in part, on the computer-implemented presentation updated to include the image retrieved from the computer-implemented storage.

Clause 6. The system of any of the preceding clauses, wherein the metrics data comprises data generated based on feedback information determined from dissemination of the prior presentations including the set of images via one or more media accessible to end-users.

Clause 7. The system of any of the preceding clauses, wherein computer-implemented presentation is comprised in one or more advertisements to be presented via social media, online advertising, television, or print media, and the memory that stores the computer-executable instructions that, as a result of execution by the one or more processors, further cause the system to at least modify the computer-implemented presentation to include the image from the computer-implemented storage.

Clause 8. The system of any of the preceding clauses, wherein the input data comprises a percentage value associated with demographic information, and rendering the second GUI input element of the GUI input elements includes generating a second input value comprising another percentage value associated with the demographic information.

Clause 9. A computer-implemented method, comprising: providing a graphical user interface (GUI) comprising GUI input elements, each GUI input element of the GUI input elements associated with a different attribute of an individual to be depicted in a computer-implemented presentation; receiving input data based on user interaction with a first GUI input element of the GUI input elements; based on the input data, querying image metadata linked to a set of images available to be included in the computer-implemented presentation, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element; identifying second data in the portion of the metadata that corresponds to the input data; rendering a second GUI input element of the GUI input elements based, at least in part, on the second data; locating an image from the set of images using the portion of the image metadata; and retrieving the image from the computer-implemented storage, the image to be displayed by the GUI.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Clause 10. The computer-implemented method of any of the preceding clauses, further comprising: rendering each GUI input element of the GUI input elements based on a plurality of individuals depicted in the computer-implemented presentation; updating the computer-implemented presentation to include the image retrieved from the computer-implemented storage; and updating the rendering of one or more of the GUI input elements based, at least in part, on the computer-implemented presentation updating to include the image retrieved from the computer-implemented storage.

Clause 11. The computer-implemented method of any of the preceding clauses, wherein the set of images includes one or more images collected based on metrics data generated from evaluating prior presentations including the set of images.

Clause 12. The computer-implemented method of any of the preceding clauses, wherein the metrics data comprises data generated based on feedback information determined from dissemination of the prior presentations including the set of images via one or more media accessible to end-users.

Clause 13. The computer-implemented method of any of the preceding clauses, wherein the input data comprises a percentage value associated with demographic information, and rendering the second GUI input element of the GUI input elements includes generating a second input value comprising another percentage value associated with the demographic information.

Clause 14. The computer-implemented method of any of the preceding clauses, wherein one or more of the GUI input elements is a GUI slider, the GUI slider is user adjustable to modify one or more of gender, race, ability, or age associated with one or more individuals depicted in the computer-implemented presentation.

Clause 15. A non-transitory computer-readable storage medium having stored thereon executable instructions that, if executed by one or more processors of a computer system, cause the computer system to at least: provide a graphical user interface (GUI) comprising GUI input elements, each GUI input element of the GUI input elements associated with a different attribute of an individual to be depicted in a computer-implemented presentation; receive input data based on user interaction with a first GUI input element of the GUI input elements; based on the input data, query image metadata linked to a set of images available to be included in the computer-implemented presentation, the image metadata comprising data for a set of individuals depicted in the set of images, the data generated from classification information stored in digital files hosted on computer-implemented storage and provided by the set of individuals depicted in the set of images, the querying including locating first data in a portion of the image metadata that corresponds to the input data received based on the user interaction with the first GUI input element; identify second data in the portion of the metadata that corresponds to the input data; render a second GUI input element of the GUI input elements based, at least in part, on the second data; locate an image from the set of images using the portion of the image metadata; and retrieve the image from the computer-implemented storage, the image to be displayed by the GUI.

Generating frameworks based on demographic image metadata and an inclusivity policy offers several technical advantages. By using demographic metadata, frameworks can be more precisely targeted to specific groups, improving relevance and engagement. This allows advertisers to tailor content according to characteristics like age, gender, race, and ability, which increases the likelihood of resonating with the intended audience. Additionally, demographic-based targeting allows for better metrics tracking, enabling continuous optimization based on the performance of the frameworks across different segments. While diversity-driven policies promote inclusivity, demographic information of the inclusivity policy can enhance personalization, leading to improved framework performance and higher conversion rates. Also, the described systems and techniques automate the creation of frameworks by dynamically adjusting framework content based on the demographic information. This can reduce the compute resources required to create different frameworks for multiple target groups, increasing compute efficiency while maintaining relevance. Advanced machine learning algorithms can be used to enable the system to better predict which frameworks would resonate with specific demographic groups. These algorithms can continuously learn from past framework performances and refine targeting strategies, improving accuracy over time by selecting imagery that can be included in the frameworks. Furthermore, the described systems and techniques can lead to sophisticated analytics tools to track the performance of frameworks based on demographic segmentation, and provide real-time feedback on engagement rates, conversion rates, and other key metrics, allowing entities to fine-tune their advertising and/or customer journey frameworks and make data-driven decisions more effectively.

Clause 16. The non-transitory computer-readable storage medium of any of the preceding clauses, wherein the computer-implemented presentation is comprised in one or more advertisements to be presented via social media, online advertising, television, or print media, the executable instructions that, if executed by one or more processors of the computer system, cause the computer system to further at least modify the computer-implemented presentation to include the retrieved image.

Clause 17. The non-transitory computer-readable storage medium of any of the preceding clauses, wherein the executable instructions that, if executed by one or more processors of a computer system, cause the computer system to at least: rendering each GUI input element of the GUI input elements based on a plurality of individuals depicted in the computer-implemented presentation; update the computer-implemented presentation to include the image retrieved from the computer-implemented storage; and update the rendering of one or more of the GUI input elements based, at least in part, on the computer-implemented presentation updated to include the image retrieved from the computer-implemented storage.

Clause 18. The non-transitory computer-readable storage medium of any of the preceding clauses, wherein the set of images includes one or more images collected based on metrics data generated from evaluating prior presentations including the set of images.

Clause 19. The non-transitory computer-readable storage medium of any of the preceding clauses, wherein the metrics data comprises data generated based on feedback information determined from dissemination of the prior presentations including the set of images via one or more media accessible to end-users.

Clause 20. The non-transitory computer-readable storage medium of any of the preceding clauses, wherein one or more of the GUI input elements is a GUI slider, the GUI slider is user adjustable to modify one or more of gender, race, ability, and age associated with one or more individuals depicted in the computer-implemented presentation.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
   one or more processors; and
   memory that stores computer-executable instructions that, as a result of execution by the one or more processors, cause the system to at least:
   analyze first image metadata to extract first classification information pertaining to a first set of individuals depicted in a presentation of images, the first image metadata generated using a neural network to classify characteristics of the first set of individuals;
   generate first data based on the first classification information, the first data including first attributes derived from the classification information associated with the first set of individuals;
   compare the first data against a set of alphanumeric characters defining one or more criteria for presentations of imagery including individuals;
   based on the comparison of the first data against the set of alphanumeric characters defining one or more criteria for presentations of imagery including individuals, determine one or more of the first attributes pertaining to the first set of individuals deviate from the set of alphanumeric characters defining one or more criteria for presentations of imagery including individuals;
   query a database including second image metadata linked to a set of images available for inclusion in the presentation of the images, the set of images selected based on metrics data generated from prior evaluations of image usage, the second image metadata comprising second data for a second set of individuals depicted in the set of images, the second data generated from second classification information stored in digital files and provided by the second set of individuals depicted in the set of images, the query identifying second attributes included in the second data that confirm to set of alphanumeric characters defining one or more criteria for presentations of imagery including individuals;
   retrieve an image from the set of images, the image associated with the second attributes pertaining to the individuals in the second set of images confirming to the set of alphanumeric characters defining one or more criteria for presentations of imagery including individuals; and
   adjust the presentation of images to include the retrieved image.

2. The system of claim 1, wherein the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising one or more of gender data, race data, ability data, or age data for individuals depicted in presentations of imagery including individuals.

3. The system of claim 1, wherein the second classification information stored in digital files and provided by the second set of individuals comprises one or more of gender data, race data, ability data, or age data information.

4. The system of claim 1, wherein the presentation of images is comprised in one or more advertisements to be presented via social media, online advertising, television, or print media, and modifying the presentation of images to include the retrieved image comprises modifying the one or more advertisements to include the retrieved image.

5. A computer-implemented method, comprising:
analyzing first image metadata to extract first classification information pertaining to a first set of individuals depicted in a presentation of images, the first image metadata generated using a neural network to classify characteristics of the first set of individuals;
generating first data based on the first classification information, the first data including first attributes derived from the classification information associated with the first set of individuals;
comparing the first data against a set of alphanumeric characters defining one or more criteria for presentations of imagery including individuals;
based on the comparison of the first data against the set of alphanumeric characters defining one or more criteria for presentations of imagery including individuals, determining one or more of the first attributes pertaining to the first set of individuals deviate from the set of alphanumeric characters defining one or more criteria for presentations of imagery including individuals;
querying a database including second image metadata linked to a set of images available for inclusion in the presentation of the images, the set of images selected based on metrics data generated from prior evaluations of image usage, the second image metadata comprising second data for a second set of individuals depicted in the set of images, the second data generated from second classification information stored in digital files and provided by the second set of individuals depicted in the set of images, the query identifying second attributes included in the second data that confirm to set of alphanumeric characters defining one or more criteria for presentations of imagery including individuals;
retrieving an image from the set of images, the image associated with the second attributes pertaining to the individuals in the second set of images confirming to the set of alphanumeric characters defining one or more criteria for presentations of imagery including individuals; and
adjusting the presentation of images to include the retrieved image.

6. The computer-implemented method of claim 5, wherein the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising one or more of gender data, race data, ability data, or age data for individuals depicted in presentations of imagery including individuals.

7. The computer-implemented method of claim 5, wherein the second classification information stored in digital files and provided by the second set of individuals comprises one or more of gender data, race data, ability data, or age data information.

8. The computer-implemented method of claim 5, wherein the presentation of images is comprised in one or more advertisements to be presented via social media, online advertising, television, or print media, and modifying the presentation of images to include the retrieved image comprises modifying the one or more advertisements to include the retrieved image.

9. The computer-implemented method of claim 5, wherein the first and second classification information comprises attribute information determined by a machine learning (ML) model trained to determine the attribute information associated with the imagery including individuals.

10. The computer-implemented method of claim 5, wherein the first attributes comprise first classification data comprising one or more of an age data, gender data, or ethnicity data of the first set of individuals depicted in the presentation of images.

11. The computer-implemented method of claim 5, wherein the one or more criteria comprises data structured in JavaScript Object Notation (JSON) format.

12. The computer-implemented method of claim 5, wherein the second image metadata comprises structured data at least for individuals depicted in imagery.

13. A non-transitory computer-readable storage medium having stored thereon executable instructions that, if executed by one or more processors of a computer system, cause the computer system to at least:
analyze first image metadata to extract first classification information pertaining to a first set of individuals depicted in a presentation of images, the first image metadata generated using a neural network to classify characteristics of the first set of individuals;
generate first data based on the first classification information, the first data including first attributes derived from the classification information associated with the first set of individuals;
compare the first data against a set of alphanumeric characters defining one or more criteria for presentations of imagery including individuals;
based on the comparison of the first data against the set of alphanumeric characters defining one or more criteria for presentations of imagery including individuals, determine one or more of the first attributes pertaining to the first set of individuals deviate from the set of alphanumeric characters defining one or more criteria for presentations of imagery including individuals;
query a database including second image metadata linked to a set of images available for inclusion in the presentation of the images, the set of images selected based on metrics data generated from prior evaluations of image usage, the second image metadata comprising second data for a second set of individuals depicted in the set of images, the second data generated from second classification information stored in digital files and provided by the second set of individuals depicted in the set of images, the query identifying second attributes included in the second data that confirm to set of alphanumeric characters defining one or more criteria for presentations of imagery including individuals;

retrieve an image from the set of images, the image associated with the second attributes pertaining to the individuals in the second set of images confirming to the set of alphanumeric characters defining one or more criteria for presentations of imagery including individuals; and adjust the presentation of images to include the retrieved image.

14. The non-transitory computer-readable storage medium of claim 13, wherein the set of alphanumeric characters defining one or more criteria for presentations of imagery including individuals is comprised in a policy including criteria for presentations of imagery including individuals, the criteria of the policy comprising the set of alphanumeric characters, and the set of alphanumeric characters comprising one or more of gender data, race data, ability data, or age data for individuals depicted in presentations of imagery including individuals.

15. The non-transitory computer-readable storage medium of claim 13, wherein the second classification information stored in digital files and provided by the second set of individuals comprises one or more of gender data, race data, ability data, or age data information.

16. The non-transitory computer-readable storage medium of claim 13, wherein the presentation of images is comprised in one or more advertisements to be presented via social media, online advertising, television, or print media, and modifying the presentation of images to include the retrieved image comprises modifying the one or more advertisements to include the retrieved image.

17. The non-transitory computer-readable storage medium of claim 13, wherein the first and second classification information comprises attribute information determined by a machine learning (ML) model trained to determine the attribute information associated with the imagery including individuals.

18. The non-transitory computer-readable storage medium of claim 13, wherein the first attributes comprise first classification data comprising one or more of an age data, gender data, or ethnicity data of the first set of individuals depicted in the presentation of images.

19. The non-transitory computer-readable storage medium of claim 13, wherein the one or more criteria comprises data structured in JavaScript Object Notation (JSON) format.

20. The non-transitory computer-readable storage medium of claim 13, wherein the second image metadata comprises structured data at least for individuals depicted in imagery.

* * * * *